United States Patent
Deshpande

(10) Patent No.: US 10,735,563 B2
(45) Date of Patent: Aug. 4, 2020

(54) SYSTEMS AND METHODS FOR DATA TRANSMISSION BASED ON A LINK LAYER PACKET STRUCTURE

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 29 days.

(21) Appl. No.: 15/750,978

(22) PCT Filed: Aug. 3, 2016

(86) PCT No.: PCT/JP2016/003587
§ 371 (c)(1),
(2) Date: Feb. 7, 2018

(87) PCT Pub. No.: WO2017/026110
PCT Pub. Date: Feb. 16, 2017

(65) Prior Publication Data
US 2018/0234525 A1    Aug. 16, 2018

Related U.S. Application Data

(60) Provisional application No. 62/202,680, filed on Aug. 7, 2015.

(51) Int. Cl.
*H04L 29/06* (2006.01)
*H04L 12/801* (2013.01)
*H04L 12/805* (2013.01)

(52) U.S. Cl.
CPC ............. *H04L 69/22* (2013.01); *H04L 47/35* (2013.01); *H04L 47/36* (2013.01); *H04L 2212/00* (2013.01)

(58) Field of Classification Search
None
See application file for complete search history.

(56) References Cited

U.S. PATENT DOCUMENTS

| 7,027,428 B2 | 4/2006 | Sugaya et al. |
| 7,890,978 B2 * | 2/2011 | Dureau ................ H04N 21/235 348/553 |
| 2015/0237175 A1 | 8/2015 | Michael |

(Continued)

FOREIGN PATENT DOCUMENTS

| JP | 2001-230795 A | 8/2001 |
| WO | 2015/002007 A1 | 1/2015 |
| WO | 2015/046836 A1 | 4/2015 |

OTHER PUBLICATIONS

ATSC Candidate Standard: Link-Layer Protocol (A/330) Doc. 533-169r2 Dec. 25, 2015.

(Continued)

*Primary Examiner* — Saumit Shah
(74) *Attorney, Agent, or Firm* — ScienBiziP, P.C.

(57) ABSTRACT

A device may be configured to generate data packets including a packet header and a payload. The packet header may include a value that signals whether the payload encapsulates input data according to a single short packet encapsulation, a single long packet encapsulation, a segmented encapsulation, or a concatenated encapsulation.

4 Claims, 12 Drawing Sheets

(56) References Cited

U.S. PATENT DOCUMENTS

| | | | | |
|---|---|---|---|---|
| 2016/0127522 A1* | 5/2016 | Yang | ............ | H04L 69/22 |
| | | | | 370/392 |
| 2016/0227005 A1* | 8/2016 | Kwon | ............ | H04L 69/324 |
| 2016/0359803 A1* | 12/2016 | Kwon | ............ | H04N 21/2343 |
| 2017/0126558 A1* | 5/2017 | Kwon | ............ | H04N 21/234 |
| 2017/0188112 A1* | 6/2017 | Takahashi | ............ | H04N 19/30 |
| 2017/0374429 A1* | 12/2017 | Yang | ............ | H04N 21/4122 |

OTHER PUBLICATIONS

ATSC A/153 P3: 2013, ATSC Mobile DTV Standard: A/153 Part 3, Service Multiplex and Transport Subsystem Characteristics, Oct. 2013.

ATSC Candidate Standard: System Discovery and Signaling (Doc. A/321 Part 1), Doc. S32-231r4, May 6, 2015.

Digital Video Broadcasting (DVB); Frame structure channel coding and modulation for a second generation digital terrestrial television broadcasting system (DVB-T2), DVB-T2, ETSI EN 302 755 V1.3.1 (Apr. 2012).

* cited by examiner

SYSTEMS AND METHODS FOR DATA TRANSMISSION BASED ON A LINK LAYER PACKET STRUCTURE

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 standard.

In defining how digital media content may be transmitted from a source to a receiver device, transmission standards may define one or more levels of abstraction. For example, data, including digital media, may originate in one of a plurality of packet structures. For example, digital video data may be encapsulated within a plurality of packets formatted according to a particular header and payload structure and data for an executable application may be encapsulated within a plurality of packets formatted according to another particular header and payload structure. Abstraction may include converting particular packet structures to a more generic packet structure. For example, an input file encapsulated within a particular packet structure may be appended with an additional header prior to transmission. In this manner, transmission standards may enable transmission of a variety of diverse data types. Current techniques for abstracting data may be less than ideal.

SUMMARY OF INVENTION

Technical Problem

In general, this disclosure describes techniques for transmitting data. In particular, this disclosure describes techniques for transmitting data according to one or more link layer packet structures. The techniques described herein may enable efficient transmission of data. The techniques described herein may be particular useful for digital media applications. It should be noted that although in some examples the techniques of this disclosure are described with respect to ATSC standards, the techniques described herein are generally applicable to any transmission standard. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband (HbbTV) standard, World Wide Web Consortium (W3C) standards, and Universal Plug and Play (UPnP) standards.

Solution to Problem

According to one example of the disclosure, a method for generating a data packet, comprises generating a packet header, wherein the packet header includes a value that signals whether the data packet encapsulates input data according to a single short packet encapsulation, a single long packet encapsulation, a segmented encapsulation, or a concatenated encapsulation; and generating a payload based at least in part on whether the data packet encapsulates input data according to a single short packet encapsulation, a single long packet encapsulation, a segmented encapsulation, or a concatenated encapsulation.

According to another example of the disclosure, a method for generating a data packet, comprises generating a packet header, wherein the packet header includes a value that signals a data packet type; and appending the packet header with an additional header based at least in part on the data packet type.

DESCRIPTION OF EMBODIMENTS

Figure 1:
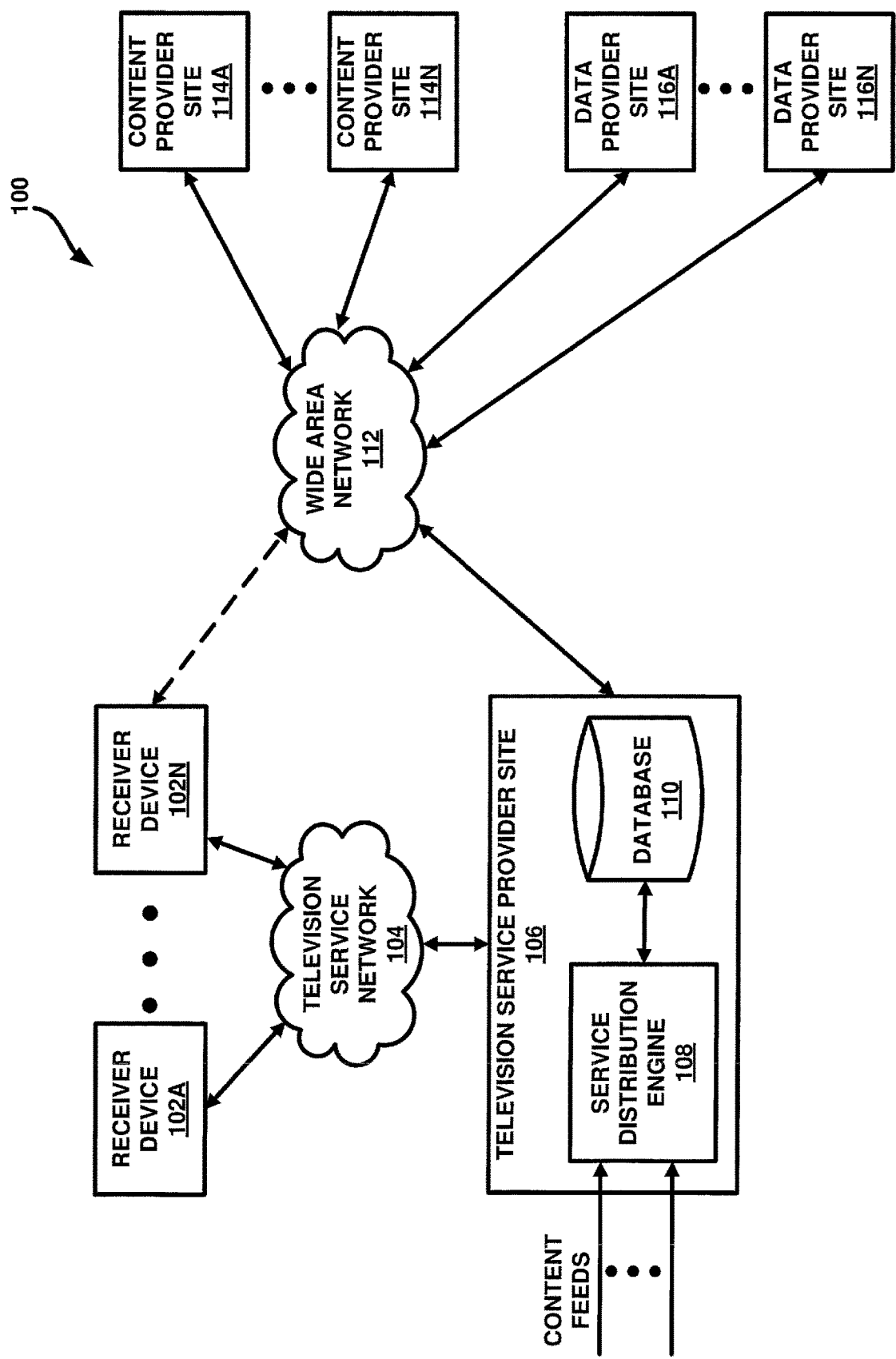
FIG. 1 is a block diagram illustrating an example of a system that may implement one or more techniques of this disclosure.

Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model, which defines a 7-layer stack model, including an application layer, a presentation layer, a session layer, a transport layer, a network layer, a data link layer, and a physical layer. It should be noted that other models may include more or fewer defined abstraction layers.

A physical layer may generally refer to a layer at which electrical signals form digital data. For example, a physical layer may refer to a layer that defines how modulated radio frequency (RF) symbols form a frame of digital data. Transmission standards may define specific physical layer implementations. For example, DVB-T2, ETSI EN 302 755 V1.3.1 (2012-04), which is incorporated by reference herein in its entirety, describes an example physical layer implementation. The physical layer for the so-called ATSC 3.0 standard is currently under development. ATSC Candidate Standard: System Discovery and Signaling (Doc. A/321 Part 1), Doc. S32-231r4, 06 May 2015 (hereinafter "A/321"), which is incorporated by reference in its entirety, describes proposed aspects of the ATSC 3.0 physical layer implementation. It should be noted that the techniques described herein may be generally applicable regardless of particular aspects of physical layer implementations.

A network layer may generally refer to a layer at which logical addressing occurs. That is, a network layer may generally provide addressing information (e.g., Internet Protocol (IP) addresses) such that data packet can be delivered to a particular node (e.g., a computing device) within a network. A transport layer may generally describe how data is routed to a particular application process at a node (e.g., a media player application process running on a computing device). It should be noted that in some transmissions applications the distinction between a network layer, a transmission layer, and/or higher layers (i.e., application layer, a presentation layer, a session layer) may be unnecessary. For example, in a broadcast application (e.g., over-the-air digital television) routing of specific data to individual receiving devices may not be necessary, as during a broadcast, data may be transmitted to all receiving nodes in the network. Thus, in some examples, the term network layer may refer to a layer that includes one more of a network layer, a transmission layer, and/or higher OSI model layers. Further, in some examples, a network layer implementation may be defined based on a set of supported defined packet structures. For example, an implemented network layer may be defined as including packets having an MPEG-TS (MPEG transport stream) packet structure or an IP version 4 (IPv4) packet structure, and optionally one or more additional similar packet structures. As used herein the term network layer may refer to a layer above a data link layer and/or a layer having data in a structure such that it may be received for data link layer processing.

As used herein, the term data link layer, which may also be referred to as link layer, includes a layer between a physical layer and a network layer. As used herein, a link layer may refer to an abstraction used to transport data from a network layer to a physical layer at a sending side and to transport data from a physical layer to a network layer at a receiving side. It should be noted that a sending side and a receiving side are logical roles and a single device may operate as both a sending side in one instance and as a receiving side in another instance. For example, a set-top box may both receive data from a cable television provider and send data to the cable television provider. As described in further detail below, a link layer may abstract various types of data (e.g., video or applications) encapsulated in particular packet types (e.g., MPEG-TS packets, IPv4 packets, or link layer signaling packets, etc.) into a single generic format for processing by a physical layer. Additionally a link layer may support segmentation of a single upper layer packet into multiple link layer packets and concatenation of multiple upper layer packets into a single link layer packet. In some cases, the term "Layer 1" or "L1" may be used to refer to the physical layer, the term "Layer 2" or "L2" may be used to refer to the link layer, and the term "Layer 3" or "L3" or "IP layer" may be used to refer to the network layer.

Abstraction of data at a link layer may provide flexibility and future extensibility of various types of data. Further, it should be noted that abstraction at a link layer may enhance transmission efficiency. For example, a link layer abstraction may remove null packets and/or redundant information in network packet headers, and thereby reduce the amount of data that is transmitted. Link layer abstractions for the physical layer associated with the ATSC 3.0 standard are currently under development. Current proposals for link layer abstractions are less than ideal.

The techniques described herein provide link layer abstractions that may increase transmission efficiency and reduce transmission errors. Increasing transmission efficiency may result in significant cost savings for network operators. It should be noted that although the example link layer abstraction techniques described herein are described with respect to a particular example physical layer, the techniques described herein are general applicable regardless of a particular physical layer implementation.

FIG. 1 is a block diagram illustrating an example of a system that may implement one or more techniques described in this disclosure. System 100 may be configured to communicate data in accordance with the techniques described herein. In the example illustrated in FIG. 1, system 100 includes one or more receiver devices 102A-102N, television service network 104, television service provider site 106, wide area network 112, one or more content provider sites 114A-114N, and one or more data provider sites 116A-116N. System 100 may include software modules. Software modules may be stored in a memory and executed by a processor. System 100 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital media content, such as, for example, a movie, a live sporting event, etc., and data and applications associated therewith, to be distributed to and accessed by a plurality of computing devices, such as receiver devices 102A-102N. In the example illustrated in FIG. 1, receiver devices 102A-102N may include any device configured to receive data from television service provider site 106. For example, receiver devices 102A-102N may be equipped for wired and/or wireless communications and may include televisions, including so-called smart televisions, set top boxes, and digital video recorders. Further, receiver devices 102A-102N may include desktop, laptop, or tablet computers, gaming consoles, mobile devices, including, for example, "smart" phones, cellular telephones, and personal gaming devices configured to receive data from television service provider site 106. It should be noted that although system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Television service network 104 is an example of a network configured to enable digital media content, which may include television services, to be distributed. For example, television service network 104 may include public over-the-air television networks, public or subscription-based satellite television service provider networks, and public or subscription-based cable television provider networks and/or over the top or Internet service providers. It should be noted that although in some examples television service network 104 may primarily be used to enable television services to be provided, television service network 104 may also enable other types of data and services to be provided according to any combination of the telecommunication protocols described herein. Further, it should be noted that in some examples, television service network 104 may enable two-way communications between television service provider site 106 and one or more of receiver devices 102A-102N. Television service network 104 may comprise any combination of wireless and/or wired communication media. Television service network 104 may include coaxial cables, fiber optic cables, twisted pair cables, wireless transmitters and receivers, routers, switches, repeaters, base stations, or any other equipment that may be useful to facilitate communications between various devices and sites. Television service network 104 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 1, television service provider site 106 may be configured to distribute television service via television service network 104. For example, television service provider site 106 may include one or more broadcast stations, a cable television provider, or a satellite television provider, or an Internet-based television provider. In the example illustrated in FIG. 1, television service provider site 106 includes service distribution engine 108 and database 110. Service distribution engine 108 may be configured to receive data, including, for example, multimedia content, interactive applications, and messages, and distribute data to receiver devices 102A-102N through television service network 104. For example, service distribution engine 108 may be configured to transmit television services according to aspects of the one or more of the transmission standards described above (e.g., an ATSC standard). In one example, service distribution engine 108 may be configured to receive data through one or more sources. For example, television service provider site 106 may be configured to receive a transmission including television programming through a satellite uplink/downlink. Further, as illustrated in FIG. 1, television service provider site 106 may be in communication with wide area network 112 and may be configured to receive data from content provider sites 114A-114N and further receive data from data provider sites 116A-116N. It should be noted that in some examples, television service provider site 106 may include a television studio and content may originate therefrom.

Database 110 may include storage devices configured to store data including, for example, multimedia content and data associated therewith, including for example, descriptive data and executable interactive applications. For example, a sporting event may be associated with an interactive application that provides statistical updates. Data associated with multimedia content may be formatted according to a defined data format, such as, for example, such as, for example, Hypertext Markup Language (HTML), Dynamic HTML, Extensible Markup Language (XML), and JavaScript Object Notation (JSON), and may include Universal Resource Locators (URLs) Uniform Resource Identifier (URI) enabling receiver devices 102A-102N to access data, e.g., from one of data provider sites 116A-116N. In some examples, television service provider site 106 may be configured to provide access to stored multimedia content and distribute multimedia content to one or more of receiver devices 102A-102N through television service network 104. For example, multimedia content (e.g., music, movies, and television (TV) shows) stored in database 110 may be provided to a user via television service network 104 on a so-called on demand basis.

Wide area network 112 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 112 may comprise any combination of wireless and/or wired communication media. Wide area network 112 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 116 may include the Internet.

Referring again to FIG. 1, content provider sites 114A-114N represent examples of sites that may provide multimedia content to television service provider site 106 and/or receiver devices 102A-102N. For example, a content provider site may include a studio having one or more studio content servers configured to provide multimedia files and/or streams to television service provider site 106. In one example, content provider sites 114A-114N may be configured to provide multimedia content using the IP suite. For example, a content provider site may be configured to provide multimedia content to a receiver device according to Real Time Streaming Protocol (RTSP), or HyperText Transport Protocol (HTTP).

Data provider sites 116A-116N may be configured to provide data, including hypertext based content, and the like, to one or more of receiver devices 102A-102N and/or television service provider site 106 through wide area network 112. A data provider site 116A-116N may include one or more web servers. Data provided by data provider site 116A-116N may be defined according to data formats, such as, for example, HTML, Dynamic HTML, XML, and JSON. An example of a data provider site includes the United States Patent and Trademark Office website. It should be noted that in some examples, data provided by data provider sites 116A-116N may be utilized for so-called second screen applications. For example, companion device(s) in communication with a receiver device may display a website in conjunction with television programming being presented on the receiver device. It should be noted that data provided by data provider sites 116A-116N may include audio and video content.

Figure 2:
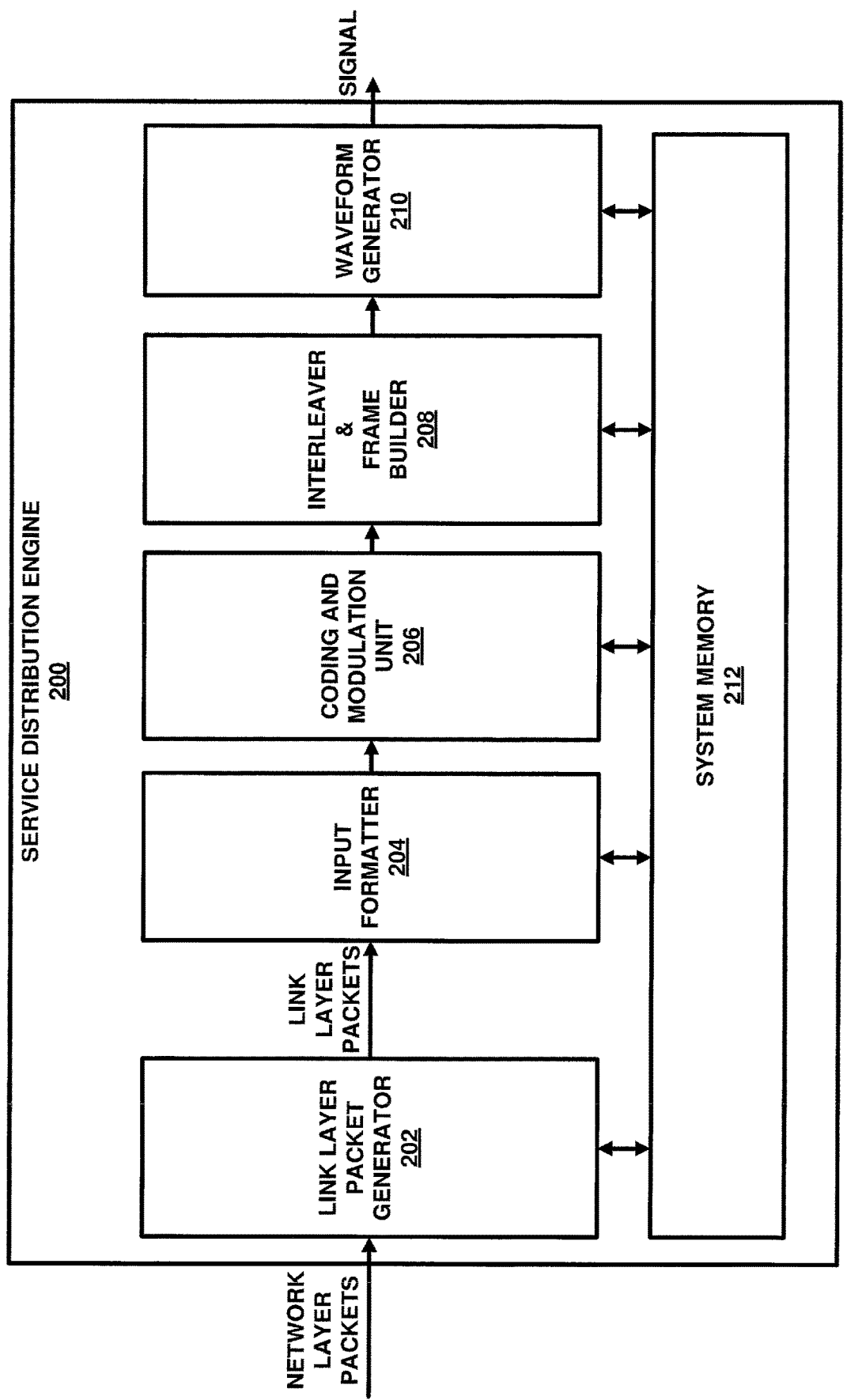
FIG. 2 is a block diagram illustrating an example of a service distribution engine that may implement one or more techniques of this disclosure.

As described above, service distribution engine 108 may be configured to receive data, including, for example, multimedia content, interactive applications, and messages, and distribute data to receiver devices 102A-102N through television service network 104. FIG. 2 is a block diagram illustrating an example of a service distribution engine that may implement one or more techniques of this disclosure. Service distribution engine 200 may be configured to receive data and output a signal representing that data for distribution over a communication network, e.g., television service network 104. For example, service distribution engine 200 may be configured to receive one or more data streams and output a signal that may be transmitted using a single radio frequency band (e.g., a 6 MHz channel, an 8 MHz channel, etc.) or a bonded channel (e.g., two separate 6 MHz channels). A data stream may generally refer to data encapsulated in a set of one or more data packets. In the example illustrated in FIG. 2, service distribution engine 200 is illustrated as receiving data in the form of network layer packets. As described above, in one example, network layer packets may include MPEG-TS packets, IPv4 packets, and the like. It should be noted that in other examples, service distribution engine 200 may receive higher layer data (e.g., a file stored on database 110, etc.) and encapsulate data into network layer packets.

Figure 3:
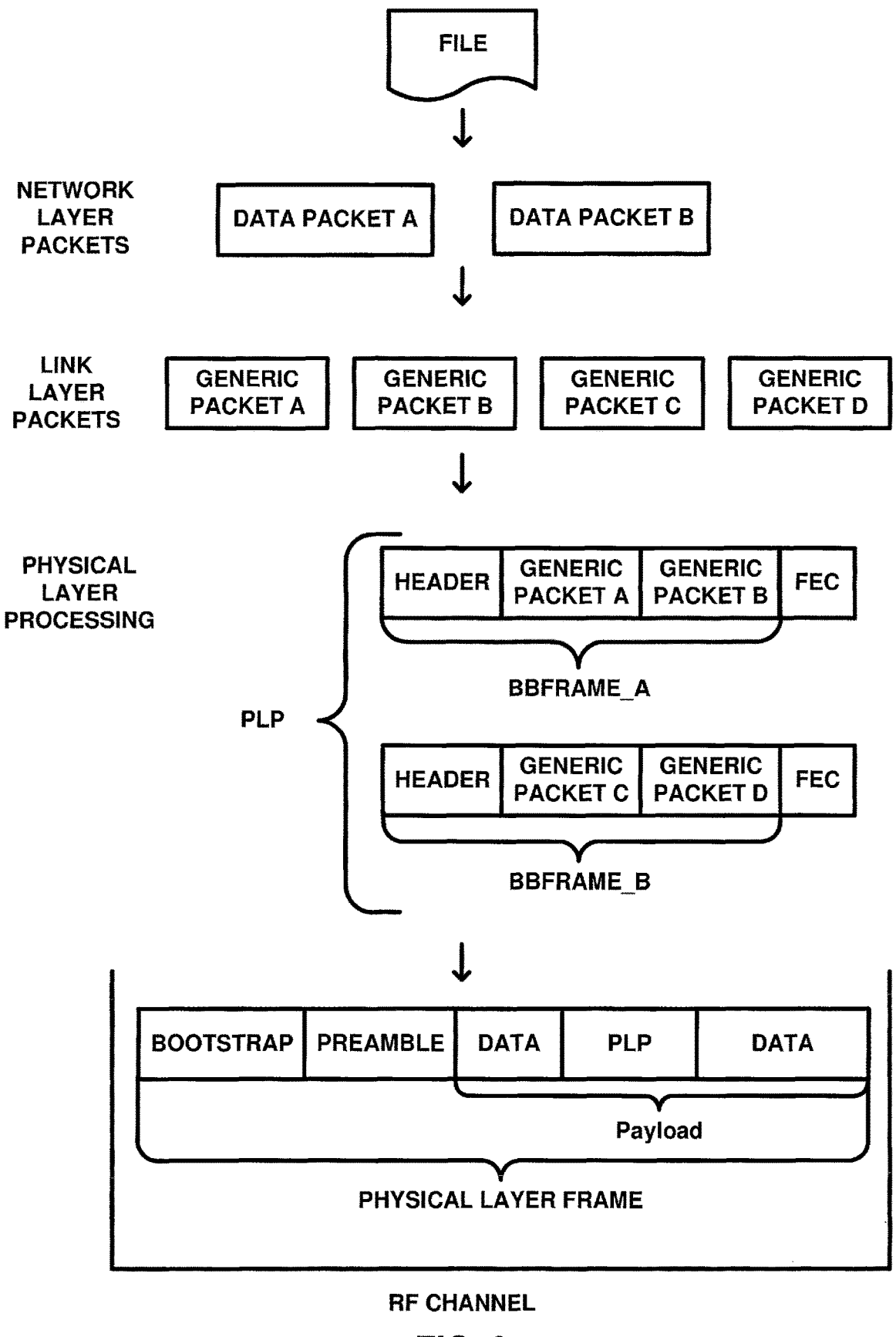
FIG. 3 is a conceptual diagram illustrating an example of generating a signal for distribution over a communication network according to one or more techniques of this disclosure.

FIG. 3 illustrates how a data file (e.g., a multimedia file, an interactive application, etc.) may be transmitted as a signal within an RF channel. In the example illustrated in FIG. 3, a file is encapsulated into network layer packets, i.e., data packet A and data packet B. Examples of types of network layer packets are described above and described in further detail below. In the example illustrated in FIG. 3, data packet A and data packet B are encapsulated into link layer packets, i.e., generic packet A, generic packet B, generic packet C, and generic packet D. It should be noted that although, in the example illustrated in FIG. 3, two network layer packets are illustrated as being encapsulated within four link layer packets (i.e., segmentation), in other examples, a number of network layer packets may be encapsulated into a smaller number of link layer packets (i.e., concatenation). For example, multiple network layer packet may be encapsulated into a single link layer packet. Aspects of a link layer packet structure may be defined according to a communications standard. For example, a link layer packet may have a header format and minimum and maximum lengths defined according to a communications standard. Examples of link layer packet structures are described in detail below with respect to FIGS. 5-9.

In the example illustrated in FIG. 3, generic packets are received for physical layer processing. In the example illustrated in FIG. 3, physical layer processing includes encapsulating generic packet A, generic packet B, generic packet C, and generic packet D in respective baseband frames, i.e., BBFrame_A and BBFrame_B. Baseband frames may form a physical layer pipe (PLP). In one example, a PLP may generally refer to a logical structure including all or portions of a data stream. In some examples, a PLP may be described as a logical channel carried within one or multiple data slices. In the example illustrated in FIG. 3, the PLP is included within the payload of a physical layer frame. As described below, PLP may be transmitted as an electronic signal.

Referring again to FIG. 2, as illustrated in FIG. 2, service distribution engine 200 includes link layer packet generator 202, input formatter 204, coding and modulation unit 206, interleaver and frame builder 208, waveform generator 210, and system memory 212. Each of link layer packet generator 202, input formatter 204, coding and modulation unit 206, interleaver and frame builder 208, waveform generator 210, and system memory 212 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 200 is illustrated as having distinct functional blocks, such an illustration is for descriptive purposes and does not limit service distribution engine 200 to a particular hardware architecture. Functions of service distribution engine 200 may be realized using any combination of hardware, firmware and/or software implementations.

System memory 212 may be described as a non-transitory or tangible computer-readable storage medium. In some examples, system memory 212 may provide temporary and/or long-term storage. In some examples, system memory 212 or portions thereof may be described as non-volatile memory and in other examples portions of system memory 212 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 212 may be configured to store information that may be used by service distribution engine 200 during operation. It should be noted that system memory 212 may include individual memory elements included within each of link layer packet generator 202, input formatter 204, coding and modulation unit 206, interleaver and frame builder 208, and/or waveform generator 210. For example, system memory 212 may include one or more buffers (e.g., First-in First-out (FIFO) buffers) configured to store data for processing by a component of service distribution engine 200.

Link layer packet generator 202 may be configured to receive network packets and generate packets according to a defined link layer packet structure. For example, link layer packet generator 202 may be configured to receive network packets and generate packets according to example link layer packet structures described below with respect to FIGS. 5-9. An example of a link layer packet generator is described in further detail below with respect to FIG. 4.

Referring again to FIG. 2, input formatter 204 may be configured to receive data, including data corresponding to multimedia content and define a PLP. Input formatter 204 may be configured to define a PLP structure for a set of received generic packets, (i.e., any of several types of link layer packets) corresponding to a data stream. In one example, input formatter 204 may be configured to determine how a set of link layer packets corresponding to a data stream will be encapsulated in one or more baseband frames. In some examples, a baseband frame may be a fixed length (e.g., defined according to a communications standard) and may include a header and a payload including generic packets.

Coding and modulation unit 206 may be configured to receive baseband frames associated with a PLP and transform the data included in the baseband frames into cells. A cell may include constellation points associated with a modulation scheme. In one example, a constellation may be defined as a set of encoded (in-phase(I)/quadrature(Q) component) points in an I/Q plane. In one example, a cell may include a modulation value for one orthogonal frequency-division multiplexing (OFDM) carrier during one OFDM symbol. That is, coding and modulation unit 206 may be configured to map bits to constellations defined according to a modulation scheme, including, for example, Quadrature Phase Shift Keying (QPSK) and Quadrature Amplitude Modulation (QAM) schemes (e.g., 16QAM, 64QAM, 256-QAM, 1024QAM, and 4096QAM). It should be noted that in some examples, coding and modulation unit 206 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

In one example, coding and modulation unit 206 may receive baseband frames and append baseband frames with forward error correction (FEC) information. In one example, forward error correction information may include an inner code and an outer code. It should be noted that in some examples, a baseband frames including forward error correction information may be referred to as an FEC frame. In one example, coding and modulation unit 206 may interleave bits included in baseband frame. That is, coding and modulation unit 206 may perform bit interleaving schemes, including, for example, parity interleaving, column twist interleaving, group-wise interleaving, and/or block interleaving. Bit-interleaving may increase the robustness of data transmission. Coding and modulation unit 206 may map interleaved bits to constellations, thereby forming cells.

Referring again to FIG. 2, interleaver and frame builder 208 may be configured to receive data cells associated with one or more PLPs and output symbols (e.g., OFDM symbols) arranged in a frame structure. A frame including one or more PLPs may be referred to as a physical layer frame (PHY-Layer frame). In one example, a frame structure may include a bootstrap, a preamble, and a data payload including one or more PLPs. A bootstrap may act as a universal entry point for a waveform. A preamble may include so-called Layer-1 signaling (L1-signaling). L1-signaling may provide the necessary information to configure physical layer parameters.

Waveform generator 210 may be configured to receive symbols arranged in frames and produce a signal for transmission. Waveform generator 210 may be configured to receive OFDM symbols and produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel). Waveform generator 210 may be configured to insert pilots and reserved tones for channel estimation and/or synchronization. In one example, pilots and reserved tones may be defined according to an OFDM symbol and sub-carrier frequency map. Waveform generator 210 may be configured to generate an OFDM waveform by mapping OFDM symbols to sub-carriers.

Figure 4:
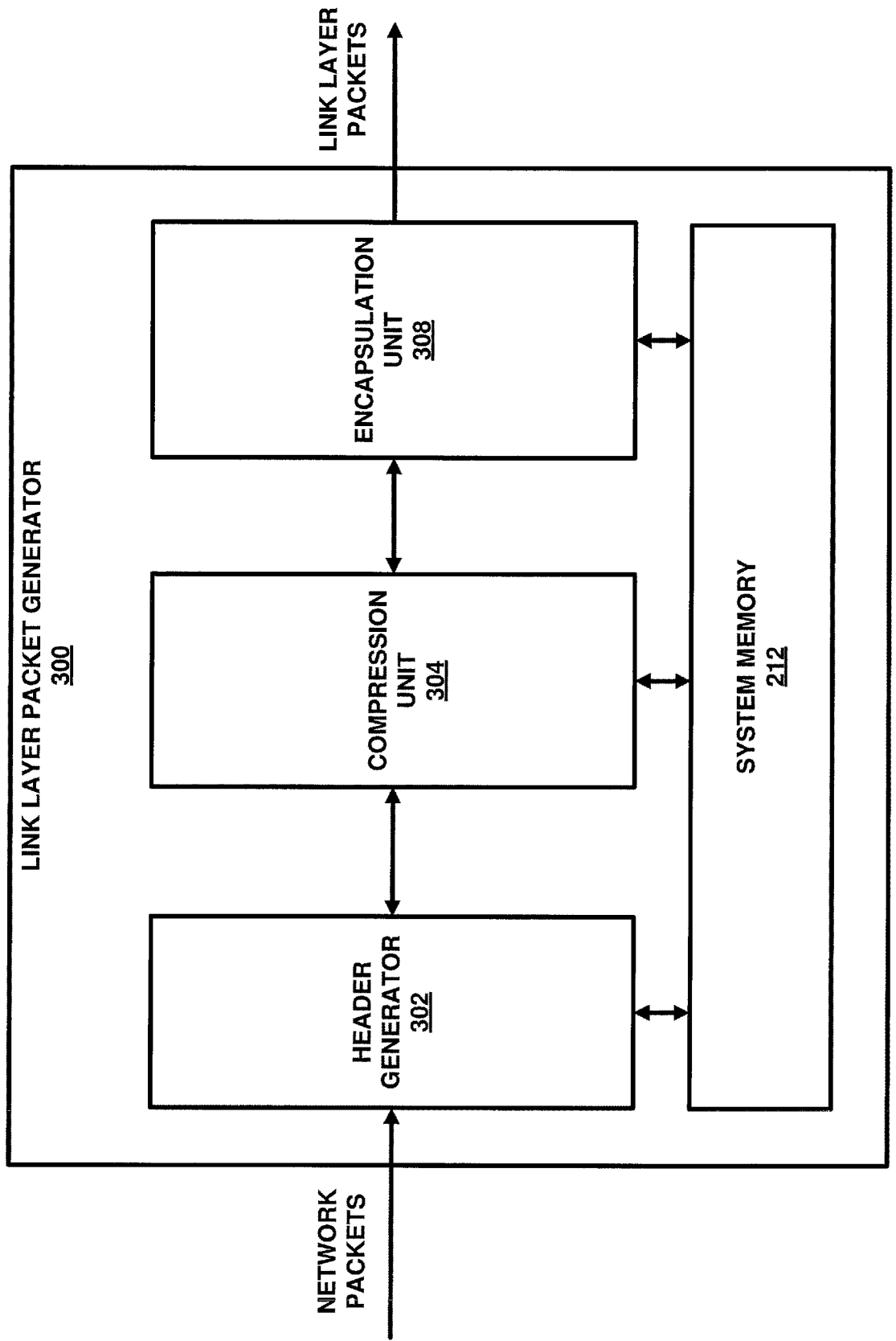
FIG. 4 is a block diagram illustrating an example of a link layer packet generator that may implement one or more techniques of this disclosure.

As described above, link layer packet generator 202 may be configured to receive network packets and generate packets according to a defined link layer packet structure. FIG. 4 is a block diagram illustrating an example of a link layer packet generator that may implement one or more techniques of this disclosure. As illustrated in FIG. 4, link layer packet generator 300 includes header generator 302, compression unit 304, and encapsulation unit 306. Each of header generator 302, compression unit 304, and encapsulation unit 306 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although link layer packet generator 300 is illustrated as having distinct functional blocks, such an illustration is for descriptive purposes and does not limit link layer packet generator 300 to a particular hardware architecture. Functions of link layer packet generator 300 may be realized using any combination of hardware, firmware and/or software implementations.

Figure 5:
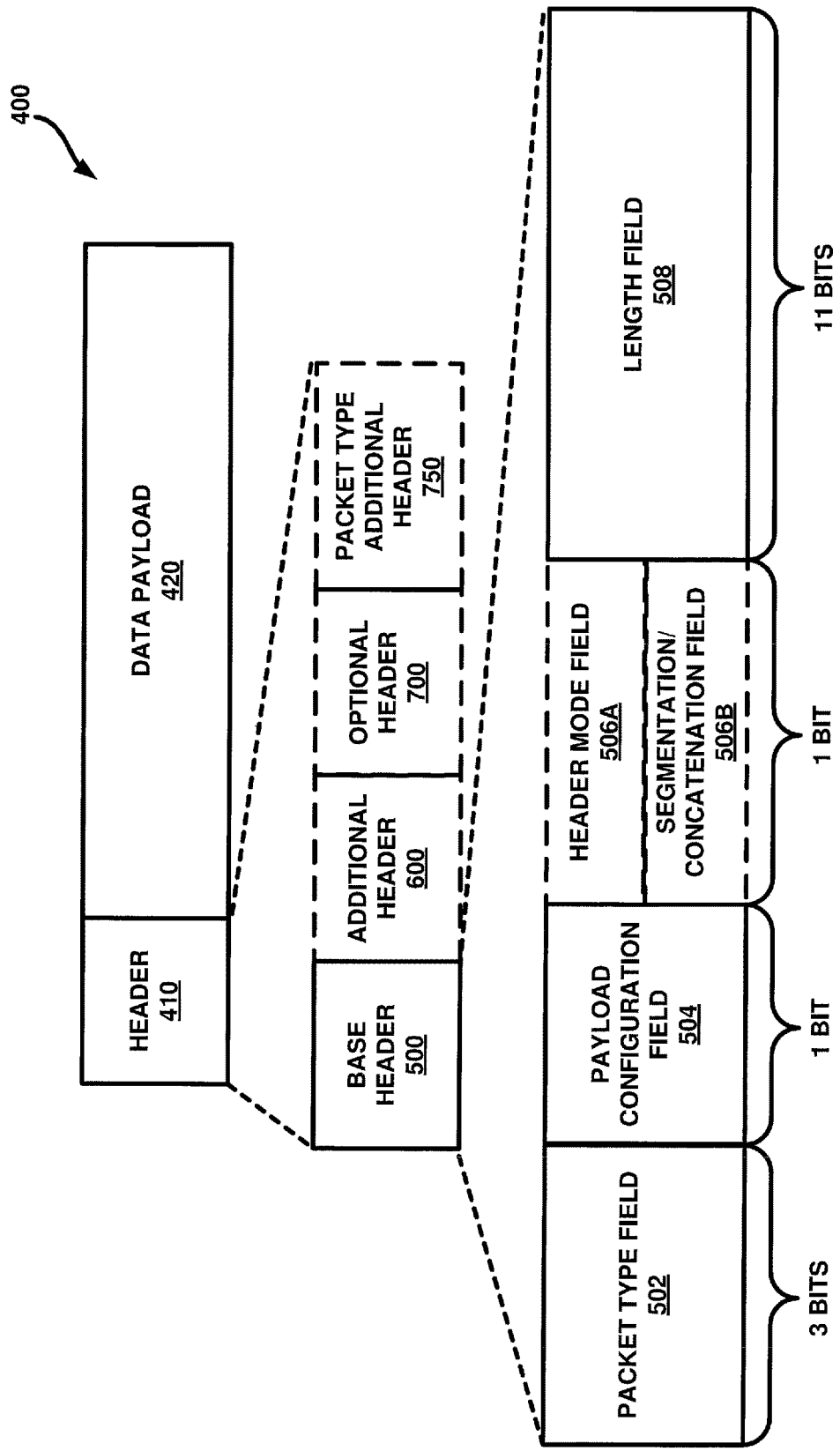
FIG. 5 is a conceptual diagram illustrating an example of a link layer packet structure according to one or more techniques of this disclosure.

Header generator 302 may be configured to generate a header for a link layer packet based on received network layer packets. Compression unit 304 may be configured to apply one or more data reduction and/or compression techniques to optimize a link layer payload size. Encapsulation unit 306 may be configured to encapsulate data included in received network layer packets. In some examples, encapsulation unit 306 may be configured to encapsulate data based one or more data reduction and/or compression techniques. FIG. 5 is a conceptual diagram illustrating an example of a link layer packet structure according to one or more techniques of this disclosure. As illustrated in FIG. 5, packet structure 400 includes header 410 and payload 420.

Header 410 may provide information identifying a type of data encapsulated within payload 420 and how the data is encapsulated within payload 420. For example, header 410 may include a field that indicates that payload 420 encapsulates a particular type of network packet. Further, header 410 may include a field that indicates link layer packets are used to provide link layer signaling. As described above, data encapsulated within payload 420 may be compressed. For example, in the case where network layer packets include MPEG-2 TS packets, multiple MPEG-2 TS packets may be encapsulated within payload 420 and a sync byte present in each MPEG-2 TS packet may be deleted, MPEG-2 TS NULL packets included in a data stream may be deleted, and/or common MPEG-2 TS headers may be deleted.

In the example illustrated in FIG. 5, base header 500 is two bytes in length and may be the minimum length of header 410. As described in detail below, in one example, base header 500 may indicate one of four types of packet configurations: a single packet without any additional header, a single packet with an additional header, a segmented packet, and a concatenated packet. In the example illustrated in FIG. 5, header 410 includes base header 500, and optionally includes, additional header 600, optional header 700, and packet type additional header 750. In one example, as described in further detail below, the presence of additional header 600 may be dependent on control fields included in base header 500, and the inclusion of optional header 700 may be indicated from flag fields included in a present additional header 600. The presence of packet type additional header 750 may be dependent on a packet type field in base header 500. For example, packet type additional header 750 may include a signaling header for a link layer signaling packet and/or a type extension header for a packet type extension packet. It should be noted that in other examples, the presence of one or more of additional header 600, optional header 700, and packet type additional header 750 may be based on other logical relationships. For example, for a particular type of packet type, as indicated by a field in base header 500, optional header 700 may be present regardless of the values of fields in additional header 600.

In the example illustrated in FIG. 5, base header 500 includes packet type field 502, payload configuration (PC) field 504, one of header mode (HM) field 506A or segmentation/concatenation field 506B and length field 508. In the example illustrated in FIG. 5, a length (e.g., a length in bits) is provided for each of packet type field 502, payload configuration field 504, one of header mode field 506A or segmentation/concatenation field 506B, and length field 508. It should be noted that in other examples the fields may have other bit lengths. For example, instead of 11 bits for length field 508, 4 bits, 8 bits, or another number of bits may be used and the number of bits used for other fields may be modified accordingly and/or additional fields may be added to base header 500.

Packet type field 502 may identify a type of network packet encapsulated within payload 420. In one example, packet type field 502 may include an example Packet_Type syntax element as defined below:

Packet_Type—This 3-bit field indicates the original protocol or packet type of the input data before encapsulation into a link layer packet as shown in Table 1 below. When the value of Packet_Type is '000', '001' '100' or '111', that is the input data is one of an IPv4 packet, a compressed IP packet, a link layer signaling packet, or an extension packet, the example syntax included in Table 2 may be used for encapsulation. When the MPEG-2 TS packet is encapsulated, the value of Packet_Type shall be '010', and an encapsulation that enables sync bytes present in MPEG-2 TS packets to be deleted, MPEG-2 TS NULL packets included in a data stream to be deleted, and common MPEG-2 TS headers to deleted, before encapsulation into a link layer packet may be used.

TABLE 1

| Packet_Type Value | Meaning |
|---|---|
| 000 | Ipv4 packet |
| 001 | Compressed IP packet |
| 010 | MPEG-2 Transport Stream |
| 011 | Reserved |
| 100 | Link layer signaling packet |
| 101 | Reserved |
| 110 | Reserved |
| 111 | Packet Type Extension |

Payload configuration field 504 may indicate whether header mode field 506A or segmentation/concatenation field 506B is present in base header 500. In one example, payload configuration field 504 may include an example Payload_Configuration syntax element as defined below:

Payload_Configuration—This 1-bit field indicates the configuration of the payload. In one example, a value of '0' indicates that the link layer packet carries a single, whole input packet and the following field is header mode field 506A and a value of '1' indicates that the packet carries more than one input packet (concatenation) or is a part of a large input packet (segmentation) and the following field is segmentation/concatenation field 506B field.

When present, header mode field 506A indicates whether additional header 600 is present and the length of the link layer packet. In one example, header mode field 506A may include an example Header_Mode syntax element as defined below:

Header_Mode—This 1-bit field, when set to '0' indicates there is no additional header, and that the length of the payload of the link layer packet is less than 2048 bytes. A value of '1' indicates that an additional header for single packet as described below is present following length field 508. In this case, when set to '1' the length of the payload is larger than 2047 bytes and/or optional features can be used (sub-stream identification, header extension, etc.). In one example, this field shall be present when PC field 504 has a value of '0'.

When present, segmentation/concatenation (S/C) field 506B may indicate whether a link layer packet is a segment of a network layer packet or whether several network layer packets are concatenated within the link layer packet. In one example segmentation/concatenation field 506B may include an example Segmentation_Concatenation syntax element as defined below:

Segmentation_Concatenation—This 1-bit field, when set to '0' indicates that the payload carries a segment of an input packet and an additional header for segmentation described below is present following length field 508. A value of '1' indicates that the payload carries more than one complete input packet and an additional header for concatenation described below is present is following the length field 508. In one example, this field shall be present when PC field 504 has a value of '1'

Length field 508 may indicate the total length of payload 420. In one example, length field 508 may include an example Length syntax element as defined below:

Length—This 1-bit field indicates the 11 least significant bits (LSBs) of the length in bytes of payload carried by the link layer packet. When there is a Length_MSB field in the following additional header, the Length field is concatenated with the Length_MSB field and is the LSB to provide the actual total length of the payload. In one example, it may be a requirement of bitstream conformance that when Payload_Configuration has a value equal to '0' and Header_Mode has a value equal to '0' the Length field shall not have a value equal to 0.

It should be noted that the requirement in example syntax element Length that when Payload_Configuration has a value equal to '0' and Header_Mode has a value equal to '0'; length field 508 shall not have a value equal to 0 prevents the sending link layer packets without payload data (i.e., the length of the payload is required to be greater than zero). That is, in this example, a link layer packet of a single packet type without an additional header, is required to have payload data. Link layer packet generator 300 may be configured such that when it generates link layer packets, link layer packets of a single packet type without an additional header are required to have payload data. Thus, when it is indicated that the packet is a single, whole input packet and there is no additional header, this constraint prevents sending blank single packets with no payload data.

As described above with respect to example syntax element Packet_Type, Table 2 includes syntax that may provide a hierarchal structure that may be used for encapsulation. That is, an example bit stream syntax of packet structure 400 is illustrated in Table 2. In Table 2, as well as in Tables 4-7, 10 and 11 below, uimsbf may refer to an unsigned integer, transmitted most significant bit first, and bslbf may refer bit string, left bit first. It should be noted that in other examples, different data types may be used for an element. For example instead of an unsigned integer data type an unsigned byte data type, or the like, may be used. Further, instead of signaling data as syntactic elements, as is the case in Tables 4-7, 10 and 11 below, data may be signaled using as an attribute, where an attribute general refers to a data value that provides more information about an element. Further, the cardinality of an element is not limited to the values illustrated in the example tables below.

As illustrated in Table 2, Additional_Header_for_Single_Packet( ) is described below with respect to Table 4, Additional_Header_for_Segmentation( ) is described below with respect to Table 5, Additional_Header_for_Concatenation( ) is described below with respect to Table 6, Additional_Header_for_Signaling_Information( ) is described below with respect to Table 10, and Additional_Header_for_Type_Extension( ) is described below with respect to Table 11.

TABLE 2

| Syntax | Number of bits | Mnemonic |
|---|---|---|
| Link_layer_Packet_Header( ) { | | |
|   Packet_Type | 3 | uimsbf |
|   Payload_Configuration | 1 | bslbf |
|   if (Payload_Configuration == "0") { | | |
|     Header_Mode | 1 | bslbf |
|     Length | 11 | uimsbf |
|     if (Header_Mode == "1") { | | |
|       Additional_Header_for_Single_Packet( ) | variable | Table 4 |
|     } | | |
|   } | | |
|   else if (Payload_Configuration == "1"){ | | |
|     Segmentation_Concatenation | 1 | bslbf |
|     Length | 11 | uimsbf |
|     if (Segmentation_Concatenation == "0") { | | |
|       Additional_Header_for_Segmentation( ) | variable | Table 5 |
|     } | | |
|     else if (Segmentation_Concatenation == "1") { | | |
|       Additional_Header_for_Concatenation( ) | variable | Table 6 |
|     } | | |
|   } | | |
|   if(Packet_Type== '100') { | | |
|     Additional_Header_for_Signaling_Information( ) | variable | Table 10 |
|   } | | |
|   else if(Packet_Type== '111') { | | |
|     Additional_Header_for_Type_Extension( ) | variable | Table 11 |
|   } | | |
| } | | |

Figure 6A:
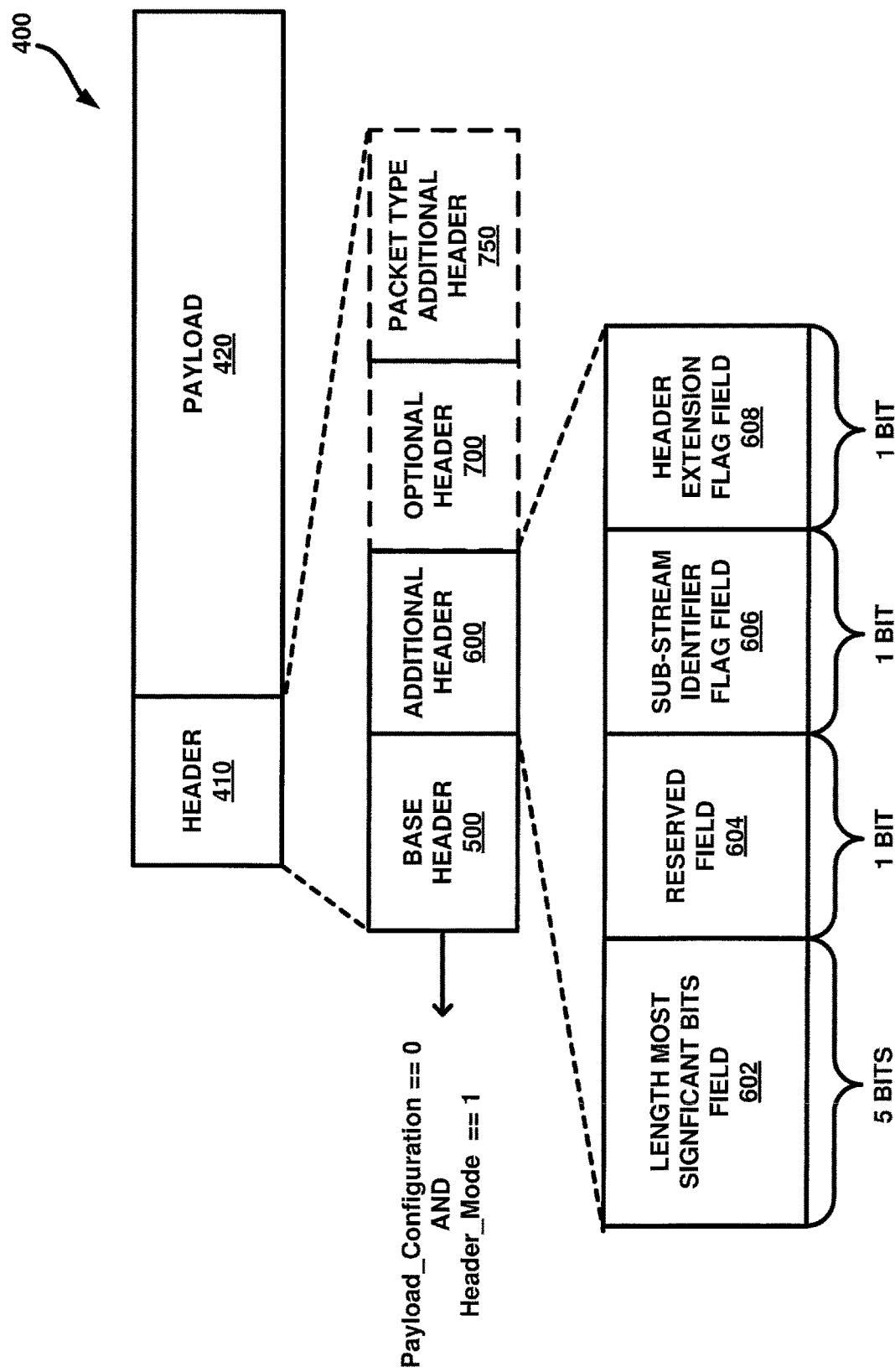
FIG. 6A is conceptual diagram illustrating an example of a link layer packet structure according to one or more techniques of this disclosure.
Figure 6B:
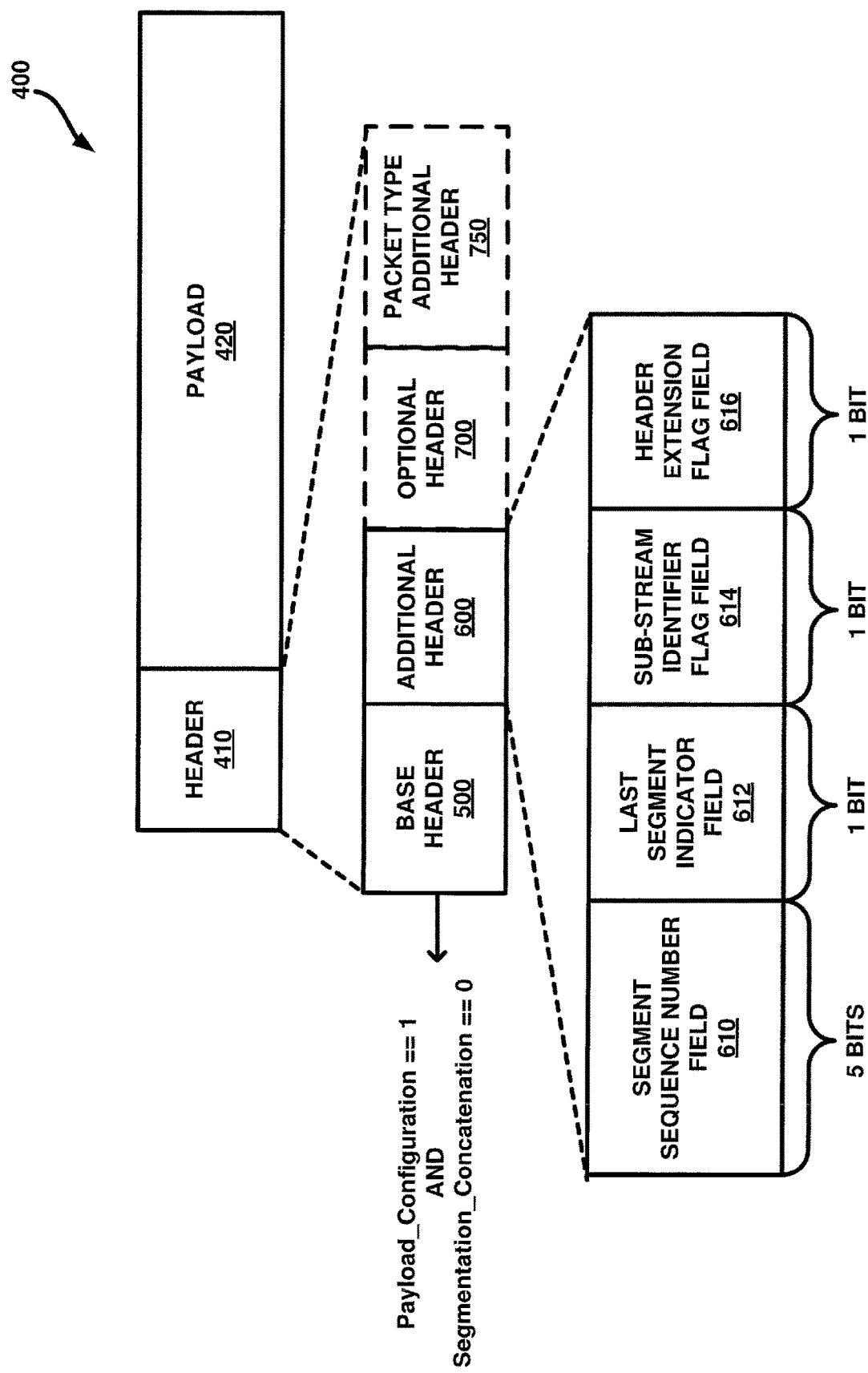
FIG. 6B is conceptual diagram illustrating an example of a link layer packet structure according to one or more techniques of this disclosure.
Figure 6C:
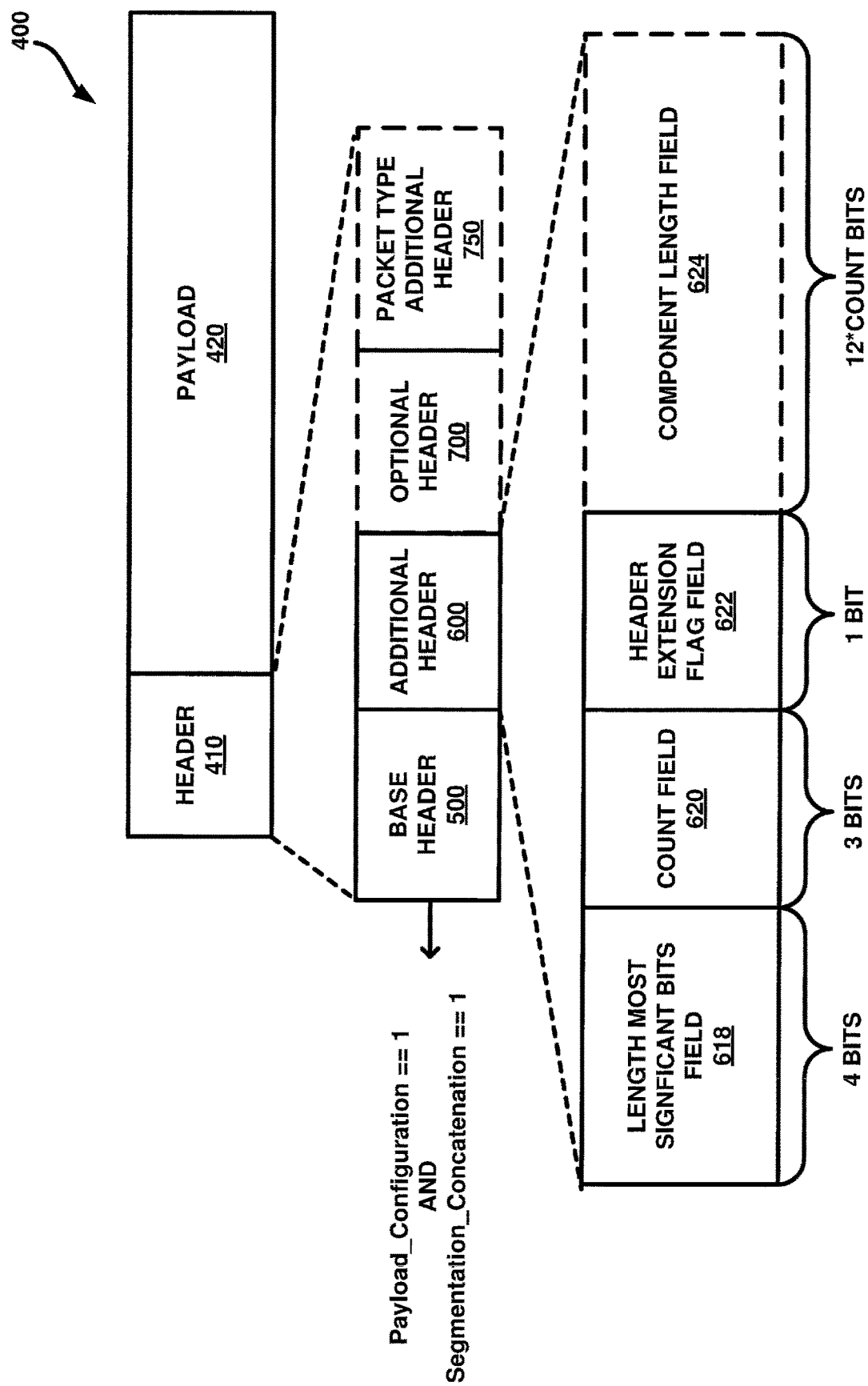
FIG. 6C is conceptual diagram illustrating an example of a link layer packet structure according to one or more techniques of this disclosure.

As illustrated in Table 2 and described above, base header 500 may indicate one of four types of packet configurations: a single packet without any additional header (which may be referred to as a single short packet), a single packet with an additional header (which may be referred to as single long packet), a segmented packet, and a concatenated packet. FIG. 6A illustrates an example additional header structure for single packets. FIG. 6B illustrates an example additional header structure for segmented packets. FIG. 6C illustrates an example additional header structure for concatenated packets. Table 3 provides a summary of respective values in base header that indicate a single packet without any additional header, a single packet with an additional header, a segmented packet, or a concatenated packet. In Table 3, Ceil refers to a ceiling function, where Ceil(x) equals the least integer that is greater than or equal to X. Each of additional header fields syntax elements Length_MSB, Seg_SN, LSI, and Count are described in detail below.

TABLE 3

| PC field | | Next Field | | Additional Header Size | Additional Header Field | Total Header Length (excluding optional header) |
|---|---|---|---|---|---|---|
| value | Meaning | Name | Value | | | |
| 0 | Single packet | HM | 0 | — | — | 2 bytes |
| | | HM | 1 | 1 byte | Length_MSB | 3 bytes |
| 1 | Segmentation or | S/C | 0 | 1 byte | Seg_SN, LSI | 3 bytes |

TABLE 3-continued

| PC field value | Meaning | Next Field Name | Additional Header Value | Additional Header Size | Additional Header Field | Total Header Length (excluding optional header) |
|---|---|---|---|---|---|---|
| | Concatenation | S/C | 1 | 1 byte | Length_MSB, Count | 3 bytes + (Ceil((Count + 1) × 1.5) bytes) |

Referring to FIG. 6A, an example additional header structure for a single packet link layer packet includes length most significant bits field 602, reserved field 604, sub-stream identifier flag field 606, and header extension flag (HEF) field 608. In the example illustrated in FIG. 6A, a length is provided for each of length most significant bits field 602, reserved field 604, sub-stream identifier flag field 606, and header extension flag field 608. It should be noted that in other examples, each of the fields may have other bit lengths.

Length most significant bits field 602 may together with length field 508 indicate the total length of payload 420. In one example, length most significant bits field 602 may include an example Length_MSB syntax element as defined below:

Length_MSB—This 5-bit field indicates the most significant bits (MSBs) of the total payload length in bytes in the current link layer packet, and is concatenated with the length field 508 containing the 11 least significant bits (LSBs) to obtain the total payload length. The maximum length of the payload that can be signaled is therefore 65535 bytes. In one example, it is a requirement of bitstream conformance that when Payload_Configuration has a value equal to '0' and Header_Mode has a value equal to '1' the Length_MSB field shall not have a value equal to 0. In another example, it is a requirement of bitstream conformance that when Payload_Configuration has a value equal to '0' and Header_Mode has a value equal to '1' the Length_MSB field shall not have a value equal to 0 when the Length field has a value equal to 0.

Reserved field 604 may be used to enable adding new values to the example syntactical structure illustrated in Table 4.

Figure 7:
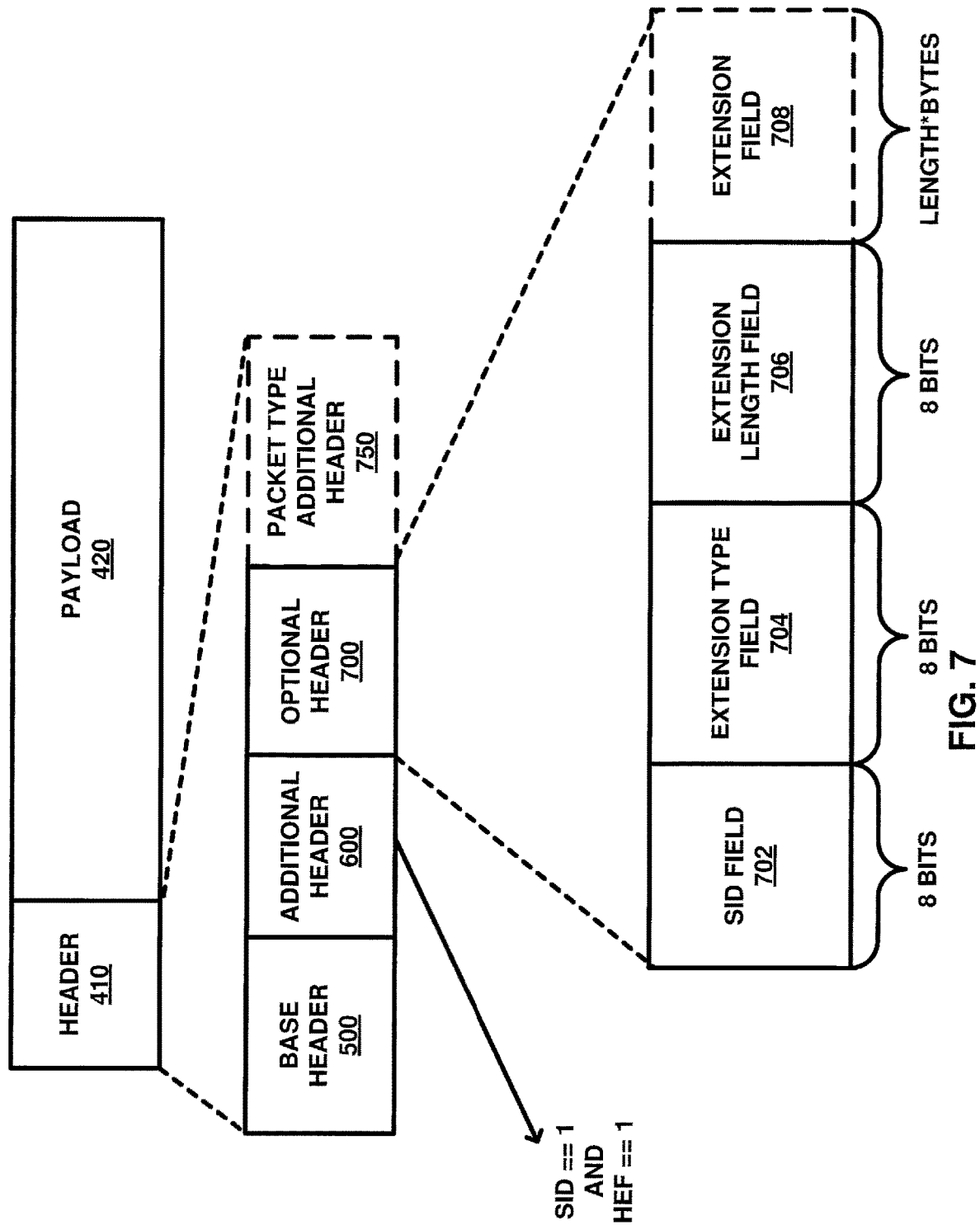
FIG. 7 is a conceptual diagram illustrating an example of a link layer packet structure according to one or more techniques of this disclosure.

Sub-stream identifier (SID) flag field 606 may indicate whether a sub-stream identifier field is present, e.g., SID field 702 illustrated in FIG. 7. In one example, sub-stream identifier flag field 606 may include an example SIF (Sub-stream Identifier Flag) syntax element as defined below:

SIF—This 1-bit field indicates whether the SID is present after header extension flag field 608. When there is no SID in this link layer packet, SIF field shall be set to '0'. When there is a SID after header extension flag field 608 in the link layer packet, SIF shall be set to '1'.

Header extension flag field 608 may indicate whether header extension fields are present, e.g., extension type field 704, extension length field 706, and extension field 708, illustrated in FIG. 7. In one example, header extension flag field 608 may include an example HEF syntax element as defined below:

HEF—This 1-bit field indicates, when set to '1' an additional header is present, e.g., for future extension. A value of '1' indicates that this extension header is not present.

An example bit stream syntax of for an additional header for single packet link layer packet type is illustrated in Table 4.

TABLE 4

| Syntax | Number of bits | Mnemonic |
|---|---|---|
| Additional_Header_for_Single_Packet ( ) { | | |
|   Length_MSB | 5 | uimsbf |
|   reserved | 1 | bslbf |
|   SIF | 1 | bslbf |
|   HEF | 1 | bslbf |
|   if (SIF =="1") { | | |
|     SID | 8 | bslbf |
|   } | | |
|   if (HEF =="1") { | | |
|     Header_Extension ( ) | Variable | Table 7 |
|   } | | |
| } | | |

It should be noted that the constraint in example syntax element Length_MSB that when Payload_Configuration has a value equal to '0' and Header_Mode has a value equal to '1,' then the Length_MSB field shall not have a value equal to 0, enhances the efficiency of single packet mode operation by requiring the single long packet to be used only when the payload length of the single packet is actual greater than 2047 bytes, which is the maximum length of the example single short packet in the example described above with respect to example syntax element Length. It should be noted that when this example constraint is imposed, due to the fact that an additional header is not present for single short packets, sub-stream identifier flag field 606 and header extension flag field 608 are only present for single packets having a payload length greater than 2047 bytes. One consequence of this is that SIDs, described in detail below with respect to FIG. 7, are not present for single packets having a payload length less than 2048 bytes. However, it should be noted that because in practice SIDs are typically not used for single packets having a payload length less than 2047 bytes, this consequence may be acceptable given the gains in efficiency for single packet mode. In one example, link layer packet generator 300 may be configured such that when it generates long single link layer packets, the length of payload data is greater than the maximum length of a single short packet (e.g., 2047 bytes).

It should be noted that the other constraint in example syntax element Length_MSB that when Payload_Configuration has a value equal to '0' and Header_Mode has a value equal to '1' the Length_MSB field shall not have a value equal to 0 when the Length field has a value equal to 0 enhances the efficiency of single packet mode operation by requiring the single long packet be not used to transmit blank or null packets. This constraint prevents sending link layer packets with 3 byte header but without payload data (i.e., the length of the payload is required to be greater than zero). That is, in this example, link layer packet of a single packet type with an additional header, is required to have payload data. Link layer packet generator 300 may be configured such that when it generates link layer packets, link layer packets of a single packet type with an additional header are required to have payload data. Thus when it is indicated that the packet is a single, whole input packet and there is an additional header, this constraint prevents sending blank single packets with no payload data.

As described above, FIG. 6B illustrates an example additional header structure for segmented packets. Referring to FIG. 6B, an example additional header structure for segmented packets includes segment sequence number field 610, last segment indicator field 612, sub-stream identifier flag field 614, and header extension flag field 616. In the example illustrated in FIG. 6B, a length is provided for each of segment sequence number field 610, last segment indicator field 612, sub-stream identifier flag field 614, and header extension flag field 616. It should be noted that in other examples the fields may have other bit lengths.

Segment sequence number field 610 may identify the segment encapsulated within a link layer packet. In one example, segment sequence number field 610 may include an example Segment_Sequence_Number syntax element as defined below:

Segment_Sequence_Number—This 5-bit unsigned integer indicates the order of the corresponding segment carried by the link layer packet. In one example, for the link layer packet which carries the first segment of an input packet, the value of this field shall be set to '0x0'. This field may be incremented by one with each additional segment belonging to the segmented input packet. In one example, it may be a requirement of bitstream conformance that when Segment_Sequence_Number is equal to '0x0', Last_Segment_Indicator shall not be equal to 1.

Last segment indicator (LSI) field 612 may indicate that the last segment of a network layer data is included in the link layer packet. In one example, last segment indicator field 612 may include an example Last_Segment_Indicator syntax element as defined below:

Last_Segment_Indicator—This 1-bit field indicates, when set to '1', that the segment in this payload is the last one of input packet. A value of '0', indicates that it is not last segment.

Sub-stream identifier flag field 614 may indicate whether a SID field is present, e.g., SID field 702 illustrated in FIG. 7. In one example, sub-stream identifier flag field 614 may include an example SIF (Sub-stream Identifier Flag) syntax element as defined below:

SIF—This 1-bit field indicates whether the sub-stream ID (SID) is present after header extension flag field 616. When there is no SID in this link layer packet, SIF field shall be set to '0'. When there is a SID after header extension flag field 616 in the link layer packet, SIF shall be set to '1'.

Header extension flag field 616 may indicate whether header extension fields are present, e.g., extension type field 704, extension length field 706, and extension field 708, illustrated in FIG. 7. In one example, header extension flag field 616 may include an example HEF syntax element as defined below:

HEF—This 1-bit field indicates, when set to '1' an additional header is present, e.g., for future extension. A value of '1' indicates that this extension header is not present.

An example bit stream syntax of additional header 600 for a segmented packet link layer packet type is illustrated in Table 5.

TABLE 5

| Syntax | Number of bits | Mnemonic |
|---|---|---|
| Additional_Header_for_Segmentation ( ) { | | |
|   Segment_Sequence_Number | 5 | uimsbf |
|   Last_Segment_Indicator | 1 | bslbf |
|   SIF | 1 | bslbf |
|   HEF | 1 | bslbf |
|   if (SIF =="1") { | | |
|     SID | 8 | bslbf |
|   } | | |
|   if (HEF =="1") { | | |
|     Header_Extension ( ) | Variable | Table 7 |
|   } | | |
| } | | |

It should be noted that the example constraint in example syntax element Segment_Sequence_Number that when Segment_Sequence_Number is equal to '0x0', Last_Segment_Indicator shall not be equal to 1, insures that segmentation mode (i.e., a link layer packet having a segmentation configuration) is not used for sending single packets. Using the segmentation mode is not required in this case, as single packet mode (i.e., a link layer packet having a long or short single packet configuration) is sufficient to send these packets. As illustrated in Table 3, using segmentation mode to send single packet incurs an overhead of one extra byte per packet compared to single short packet mode. It should be noted that the above constraint which requires that when Segment_Sequence_Number is equal to '0x0', Last_Segment_Indicator shall not be equal to 1, may instead be written as: when Segment_Sequence_Number is equal to '0x0', Last_Segment_Indicator shall be equal to 0. In one example, link layer packet generator 300 may be configured such that segmentation mode is not used for sending a single segmentation link layer packet.

As described above, FIG. 6C illustrates an example additional header structure for concatenated packets. Referring to FIG. 6C, an example additional header structure for concatenated packets includes length most significant bits field 618, count field 620, header extension flag 622, and component length field 624. In the example illustrated in FIG. 6C, a length is provided for each of length most significant bits field 618, count field 620, header extension flag 622, and component length field 624. It should be noted that in other examples the fields may have other bit lengths.

Length most significant bits field 618 may indicate may indicate the total length of payload 420. In one example, length most significant bits field 618 may include an example Length_MSB syntax element as defined below:

Length_MSB—This 4-bit field indicates MSB bits of the payload length in bytes in this link layer packet. The maximum length of the payload is 32767 bytes for concatenation.

Count field 620 may indicate the number of network layer packets included in a link layer packet. In one example, count field 620 may include an example Count syntax element as defined below:

Count—This field indicates the number of concatenated packets included in the link layer packet. The number of the packets included in the link layer packet-2 shall be set to this field. In one example, the maximum value of concatenated packets in a link layer packet is 9 and the minimum value of concatenated packets in a link layer packet is 2.

Header extension flag 622 may indicate whether a header extension fields are present, e.g., extension type field 704, extension length field 706, and extension field 708, illustrated in FIG. 7. In one example, header extension flag 622 may include an example HEF syntax element as defined below:

HEF—This 1-bit field indicates, when set to '1' the optional header extension is present after component length field 624 of the link layer header. A value of '0', shall indicate extension header is not present.

Component length field 624 may indicate the length of each concatenated packet. In one example, component length field 624 may include an example Component_Length syntax element as defined below:

Component_Length—This is 12-bit length field indicates the length in bytes of each packet. Component_Length fields are included in the same order as the packets present in the payload except last component packet. The number of Component_length fields equals (Count+1). In one example, it is a requirement of bitstream conformance that sum of Component_Length values for i in the range of 0 to Count+1, inclusive shall be less than or equal to 32766 bytes. In one example, it is requirement of bitstream conformance that any Component_Length value for i in the range of 0 to Count+1, inclusive shall not be equal to 0. When a link layer header consists of an odd number of Component_Length, four stuffing bits may follow after the last Component_Length field. These bits may be set to '0'

An example bit stream syntax of an additional header structure for concatenation packet link layer packet type is illustrated in Table 6.

TABLE 6

| Syntax | Number of bits | Mnemonic |
| --- | --- | --- |
| Additional_Header_for_Concatenation( ) { | | |
|   Length_MSB | 4 | uimsbf |
|   Count | 3 | uimsbf |
|   HEF | 1 | bslbf |
|   for(i=0; i<Count+1; i++) { | | |
|     Component_Length | 12 | uimsbf |
|   } | | |
|   if (HEF =="1") { | | |
|     Header_Extension ( ) | Variable | Table 7 |
|   } | | |
| } | | |

It should be noted that the example constraint in example syntax element Component_Length that sum of Component_ Length values for i in the range of 0 to Count+1, inclusive shall be less than or equal to 32766 bytes insures that the sum of the lengths of the concatenated packets does not exceed the maximum allowable length of the payload. Further, the example constraint in example syntax element Component_Length that any Component_Length value for i in the range of 0 to Count+1, inclusive shall not be equal to 0 insures the component packets having a length of zero are not included the payload. This prevents including a component packet with empty payload data in this concatenated packet. In one example, link layer packet generator 300 may be configured such that concatenation mode is implemented according to one or more of the constraints described above.

As described above packet structure 400 may include optional header 700. FIG. 7 illustrates an example optional header structure. Referring to FIG. 7, an example optional header 700 structure includes SID field 702, extension type field 704, extension length field 706, and, optionally, extension field 708. In the example illustrated in FIG. 7, a length is provided for each of SID field 702, extension type field 704, extension length field 706, and extension field 708. It should be noted that in other examples the fields may have other bit lengths.

SID field 702 may indicate a sub-stream identifier. The SID may be used to filter out specific packet stream in the link layer level. One example use of SID is as a service identifier in a link layer stream carrying multiple services. The mapping information between a service and the SID value corresponding to the service may be provided as a service level descriptor, if applicable. In one example, SID field 702 may include an example SID syntax element as defined below:

SID—This 8-bit field indicates the sub-stream identifier for the link layer packet. If there is an optional header extension, SID is present between additional header 600 and optional header extension.

Extension type field 704 may indicate a type of header extension. In one example, extension type field 704 may include an example Extension_Type syntax element as defined below:

Extension_Type—This 8-bit field indicates the type of the Header_Extension ( ).

Extension length field 706 may indicate the length of a header extension. In one example, extension length field 706 may include an example Extension_Length syntax element as defined below:

Extension_Length—This 8-bit field indicates the length of the Header Extension ( ) in bytes counting from the next byte to the last byte of the Header_Extension ( ).

Extension field 708 may include a value of a header extension. The header extension may contain an extended field for future use. In one example, receiver may ignore any header extensions that they are unable to parse. In one example, extension field 708 may include an example Extension_Byte syntax element as defined below:

Extension_Byte—A byte representing the value of the Header_Extension 0.

An example bit stream syntax of a header extension of an optional header 700 is illustrated in Table 7.

TABLE 7

| Syntax | Number of bits | Mnemonic |
| --- | --- | --- |
| Header Extension ( ) { | | |
|   Extension_Type | 8 | uimsbf |
|   Extension_Length | 8 | uimsbf |
|   for(i=0; i<Length-1; i++) { | | |
|     Extension_Byte | 8 | uimsbf |
|   } | | |
| } | | |

Figure 8:
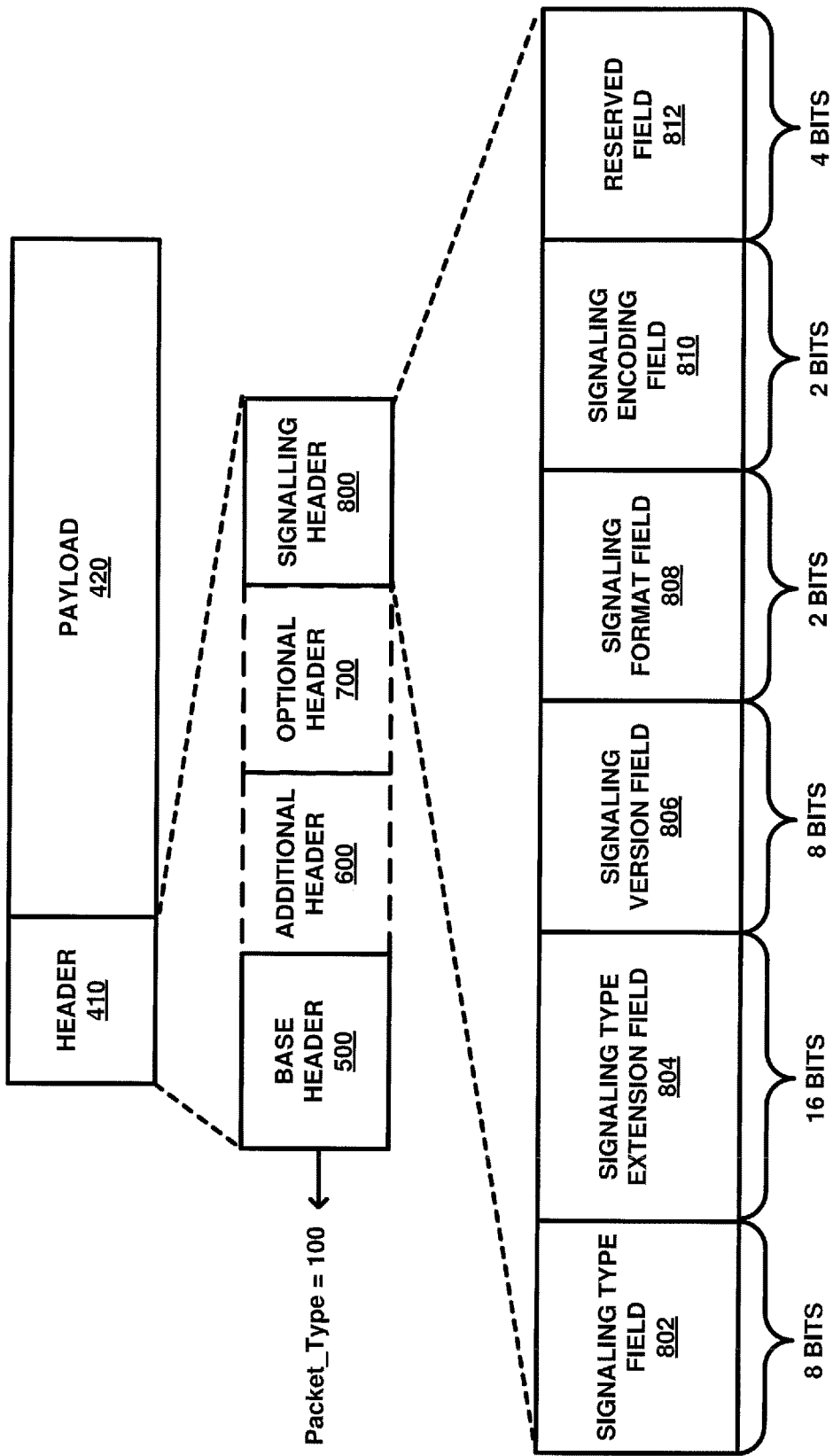
FIG. 8 is a conceptual diagram illustrating an example of a link layer packet structure according to one or more techniques of this disclosure.

As described above, signaling packets may be used to provide link layer signaling using link layer packets. Referring to the examples illustrated in Table 1 and Table 2, signaling packets may be identified by Packet_Type field of the base header 500 being equal to '100'. FIG. 8 illustrates an example additional header for signaling information. As illustrated in FIG. 8, signaling header 800 includes signaling type field 802, signaling type extension field 804, signaling version field 806, signaling format field 808, signaling encoding field 810, and reserved field 812. In the example illustrated in FIG. 8, a length is provided for each of signaling type field 802, signaling type extension field 804, signaling version field 806, signaling format field 808, signaling encoding field 810, and reserved field 812. It should be noted that in other examples these fields may have other bit lengths.

Signaling type field 802 may indicate a type of signaling. In one example, length field 508 may include an example Signaling_Type syntax element as defined below:

SignalingType—This 8-bit field indicates the type of signaling.

Signaling type extension field 804 may indicate an attribute of signaling. In one example, signaling type extension field 804 may include an example Signaling_Type_Extension syntax element as defined below:

SignalingType_Extension—This 16-bit filed indicates the attribute of the signaling. Details of this field may be defined in a signaling specification.

Signaling version field 806 may indicate a version of signaling. In one example, signaling version field 806 may include an example Signaling_Version syntax element as defined below:

SignalingVersion—This 8-bit field shall indicate the version of signaling.

Signaling format field 808 may indicate a format of signaling data. In one example, signaling format field 808 may include an example Signaling_Format syntax element as defined below:

SignalinFormat—This 2-bit field indicates the data format of the signaling data as described in example Table 8.

TABLE 8

| Signaling_Format | Meaning |
| --- | --- |
| 00 | Binary |
| 01 | XML |
| 10 | JSON |
| 11 | Reserved |

It should be noted that in other examples, values 00, 01, 10 and 11 may indicate other data formats than those illustrated in Table 8. For example, each of 00, 01, 10 and 11 may respectively correspond to one of: Binary, XML, JSON, HTML, Comma Separated Values (CSV), Backus-Naur Form (BNF), Augmented Backus-Naur Form (ABNF), and Extended Backus-Naur Form (EBNF). Further, it should be noted that in one example, value 11 may indicate that reserved field 812 indicates a data format.

Signaling encoding field 810 may indicate an encoding/compression format of signaling data. In one example, Signaling encoding field 810 may include an example Signaling_Encoding syntax element as defined below:

SignalingEncoding—This 2-bit field specifies the encoding/compression format. Example code values of Signaling_Encoding field are described in Table 9.

TABLE 9

| Signaling_Encoding | Number of bits |
| --- | --- |
| 00 | No Compression |
| 01 | DEFLATE (RFC 1951) |
| 10 | GZIP (RFC 1952) |
| 11 | Reserved |

With respect to Table 9 the RFC relates to a Request for Comments (RFC) published by the Internet Engineering Task Force (IETF). For example RFC 1951 is found at: https://www.ietf.org/rfc/rfc_1951.txt and RFC 1952 is found at https://www.ietf.org/rfc/rfc_1952.txt respectively. It should be noted that in other examples, values 00, 01, 10 and 11 may indicate other signal encodings than those illustrated in Table 9. For example, each of 00, 01, 10 and 11 may respectively correspond to one of: No compression, DEFLATE, GZIP, adaptive Lempel-Ziv-Welch coding (LZW), or other types of lossless data compression algorithms (Context-adaptive binary arithmetic coding (CABAC), Context-adaptive variablelength coding (CAVLC), etc.). Further, it should be noted that in some examples, there may be one or more logical relationships between a value of Signaling_Format and a value of Signaling_Encoding. For example, for a binary format it may not be efficient to use DEFLATE or GZIP encoding. In one example, this condition can be avoided. For example, constraints such as: when Signaling_Format is Binary (00) the Signaling_Encoding shall not be set to DEFLATE (01) or GZIP (10) or when Signaling_Format is Binary (00) the Signaling_Encoding shall be set to No Compression (00) may be implemented by link layer packet generator 300.

An example bit stream syntax of a signaling header 800 is illustrated in Table 10.

TABLE 10

| Syntax | Number of bits | Mnemonic |
| --- | --- | --- |
| Additional_Header_for_Signaling_Information( ) { | | |
| Signaling_Type | 8 | uimsbf |
| Signaling_Type_Extension | 16 | bslbf |
| Signaling_Version | 8 | uimsbf |
| Signaling_Format | 2 | uimsbf |
| Signaling_Encoding | 2 | uimsbf |
| Reserved | 4 | bslbf |
| } | | |

Figure 9:
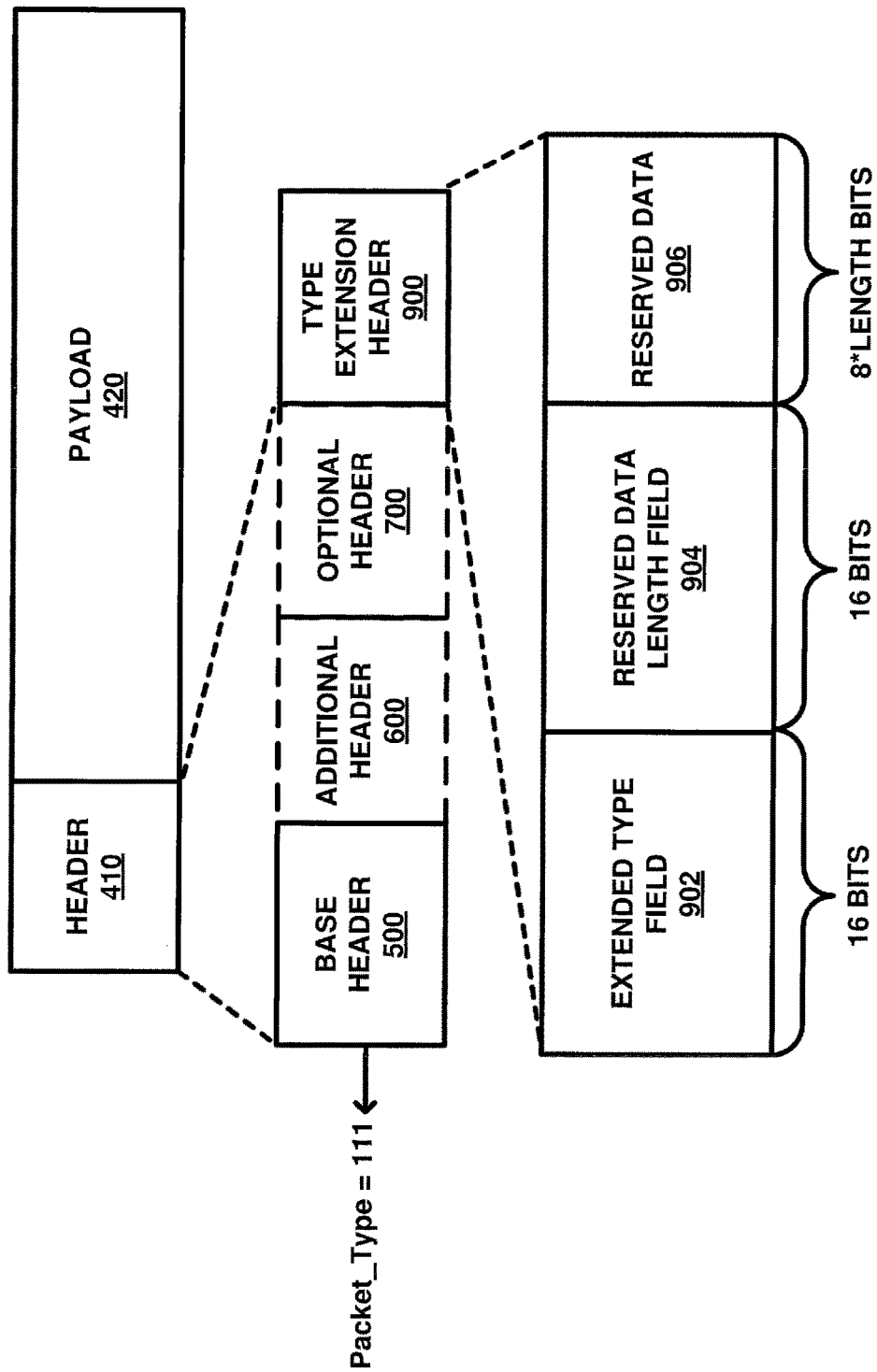
FIG. 9 is a conceptual diagram illustrating an example of a link layer packet structure according to one or more techniques of this disclosure.

In order to provide a mechanism to allow an almost unlimited number of additional protocol and packet types to be carried by link layer packets in the future, an additional extension type header may be defined for link layer packet. Referring to the examples illustrated in Table 1 and Table 2, extension type packets may be identified by Packet_Type field of the base header 500 being equal to '111.' FIG. 9 illustrates an example additional extension type header structure. As illustrated in FIG. 9, type extension header 900 includes extended type field 902, reserved data length field 904, and reserved data 906. In the example illustrated in FIG. 9, a length is provided for each of extended type field 902, reserved data length field 904, and reserved data 906. It should be noted that in other examples the fields may have other bit lengths.

Extended type field 902 may indicate a type of data encapsulated with payload 420. In one example, extended type field 902 may enable IPs (e.g., IPv6), media containers (e.g., ISOBMFF (International Standards Organization base media file format)), Ethernet standards, and/or other types of data to be supported. In one example, extended type field 902 may include an example extended_type syntax element as defined below:

extended_type—this 16-bit field indicates the protocol or packet type of the input encapsulated in the link layer packet as a payload. In one example, this field shall not be used for any protocol or packet type already defined in Table 1.

Reserved data length field 904 may indicate the length of reserved data 906. In one example, reserved data length field 904 may include an example Reserved_data_length syntax element as defined below:

Reserved_data_length—this 16 bit field indicates the length in bytes of Reserved_data ( ) field which immediately follows this field.

Reserved data 906 may include data that supports an extended type of data. In one example, reserved data 906 may include an example Reserved_data( ) syntax element as defined below:

Reserved_data( )—this field of length Reserved_data length bytes may have any value and is not restricted.

An example bit stream syntax of a header extension of a type extension header 900 is illustrated in Table 11.

TABLE 11

| Syntax | Number of bits | Mnemonic |
|---|---|---|
| Additional_Header_for_Type_Extension( ) | | |
| { | | |
|    extended_type | 16 | uimsbf |
|    Reserved_data_length | 16 | uimsbf |
|    Reserved_Data( ) | 8 * Reserved_data_length | |
| } | | |

In one example the additional header for type extension may use different length for various fields. For example instead of using 16 bits for the Reserved_data_length field, 8 bits may be used as illustrated in Table 12.

TABLE 12

| Syntax | Number of bits | Mnemonic |
|---|---|---|
| Additional_Header_for_Type_Extension( ) | | |
| { | | |
|    extended_type | 16 | uimsbf |
|    Reserved_data_length | 8 | uimsbf |
|    Reserved_Data( ) | 8 * Reserved_data_length | |
| } | | |

In this case with respect to Table 12 syntax and semantics for fields may be as shown below.

Reserved data length field 904 may indicate the length of reserved data 906. In one example, reserved data length field 904 may include an example Reserved_data_length syntax element as defined below:

Reserved_data_length—this 8 bit field indicates the length in bytes of Reserved_data ( ) field which immediately follows this field.

Reserved data 906 may include data that supports an extended type of data. In one example, length field 508 may include an example Reserved_data( ) syntax element as defined below:

Reserved_data( )—this field of length Reserved_data_length bytes may have any value and is not restricted.

It should be noted that in the above description various constraints are described with the words "It is a requirement of bit stream conformance that xxx", where xxx indicates the particular constraint. Instead in a variant embodiment various constraints may be described with the words "It is a requirement that xxx", where xxx indicates the particular constraint. Also instead in in yet another variant embodiment various constraints may be described with the words "It is required that xxx", where xxx indicates the particular constraint. Additionally other similar words enforcing the particular constraints may be used instead of those words described above for each particular constraint.

Figure 10:
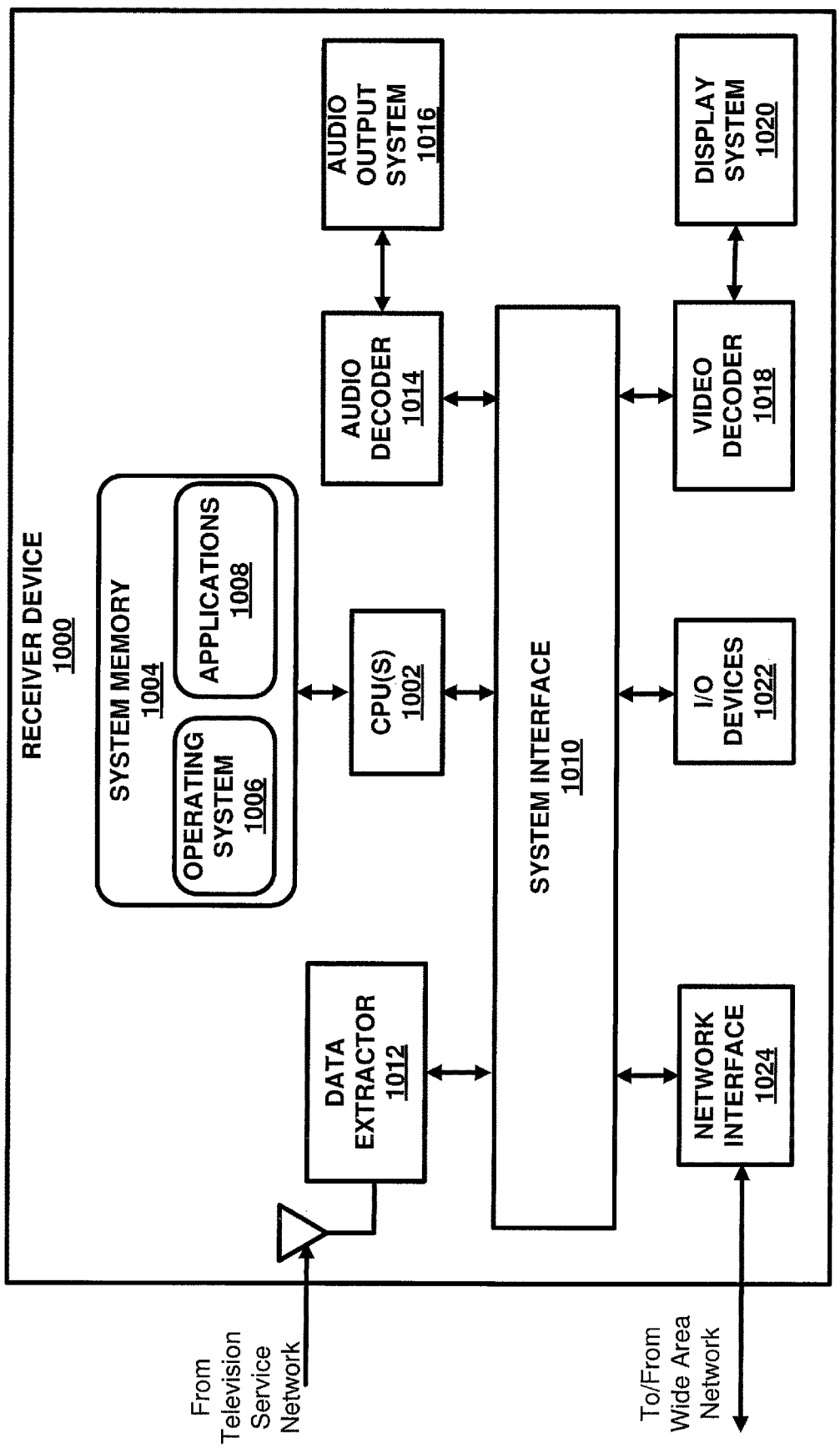
FIG. 10 is a block diagram illustrating an example of a receiver device that may implement one or more techniques of this disclosure.

FIG. 10 is a block diagram illustrating an example of a receiver device that may implement one or more techniques of this disclosure. Receiver device 1000 is an example of a computing device that may be configured to receive data from a communications network and allow a user to access multimedia content. In the example illustrated in FIG. 10, receiver device 1000 is configured to receive data via a television network, such as, for example, television service network 104 described above. Further, in the example illustrated in FIG. 10, receiver device 1000 is configured to send and receive data via a wide area network. It should be noted that in other examples, receiver device 1000 may be configured to simply receive data through a television service network 104. The techniques described herein may be utilized by devices configured to communicate using any and all combinations of communications networks.

As illustrated in FIG. 10, receiver device 1000 includes central processing unit(s) 1002, system memory 1004, system interface 1010, data extractor 1012, audio decoder 1014, audio output system 1016, video decoder 1018, display system 1020, I/O device(s) 1022, and network interface 1024. As illustrated in FIG. 10, system memory 1004 includes operating system 1006 and applications 1008. Each of central processing unit(s) 1002, system memory 1004, system interface 1010, data extractor 1012, audio decoder 1014, audio output system 1016, video decoder 1018, display system 1020, I/O device(s) 1022, and network interface 1024 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 1000 is illustrated as having distinct functional blocks, such an illustration is for descriptive purposes and does not limit receiver device 1000 to a particular hardware architecture. Functions of receiver device 1000 may be realized using any combination of hardware, firmware and/or software implementations.

CPU(s) 1002 may be configured to implement functionality and/or process instructions for execution in receiver device 1000. CPU(s) 1002 may include single and/or multi-core central processing units. CPU(s) 1002 may be capable of retrieving and processing instructions, code, and/or data structures for implementing one or more of the techniques described herein. Instructions may be stored on a computer readable medium, such as system memory 1004.

System memory 1004 may be described as a non-transitory or tangible computer-readable storage medium. In some examples, system memory 1004 may provide temporary and/or long-term storage. In some examples, system memory 1004 or portions thereof may be described as non-volatile memory and in other examples portions of system memory 1004 may be described as volatile memory. System memory 1004 may be configured to store information that may be used by receiver device 1000 during operation. System memory 1004 may be used to store program instructions for execution by CPU(s) 1002 and may be used by programs running on receiver device 1000 to temporarily store information during program execution. Further, in the example where receiver device 1000 is included as part of a digital video recorder, system memory 1004 may be configured to store numerous video files.

Applications 1008 may include applications implemented within or executed by receiver device 1000 and may be implemented or contained within, operable by, executed by, and/or be operatively/communicatively coupled to components of receiver device 1000. Applications 1008 may include instructions that may cause CPU(s) 1002 of receiver device 1000 to perform particular functions. Applications 1008 may include algorithms which are expressed in computer programming statements, such as, for-loops, while-loops, if-statements, do-loops, etc. Applications 1008 may be developed using a specified programming language. Examples of programming languages include, Java (Registered Trademark), Jini (Registered Trademark), C, C++, Objective C, Swift, Perl, Python, PhP, UNIX Shell, Visual Basic, and Visual Basic Script. In the example where receiver device 1000 includes a smart television, applications may be developed by a television manufacturer or a broadcaster. As illustrated in FIG. 10, applications 1008 may execute in conjunction with operating system 1006. That is, operating system 1006 may be configured to facilitate the interaction of applications 1008 with CPUs(s) 1002, and other hardware components of receiver device 1000. Operating system 1006 may be an operating system designed to be installed on set-top boxes, digital video recorders, televisions, and the like. It should be noted that techniques described herein may be utilized by devices configured to operate using any and all combinations of software architectures.

System interface 1010 may be configured to enable communications between components of receiver device 1000. In one example, system interface 1010 comprises structures that enable data to be transferred from one peer device to another peer device or to a storage medium. For example, system interface 1010 may include a chipset supporting Accelerated Graphics Port (AGP) based protocols, Peripheral Component Interconnect (PCI) bus based protocols, such as, for example, the PCI Express (Registered Trademark) (PCIe) bus specification, which is maintained by the Peripheral Component Interconnect Special Interest Group, or any other form of structure that may be used to interconnect peer devices (e.g., proprietary bus protocols).

As described above, receiver device 1000 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 10, data extractor 1012 may be configured to extract video, audio, and data from a signal. A signal may be defined according to, for example, aspects DVB standards, ATSC standards, ISDB standards, DTMB standards, DMB standards, and DOCSIS standards.

Data extractor 1012 may be configured to extract video, audio, and data, from a signal generated by service distribution engine 200 described above. That is, data extractor 1012 may operate in a reciprocal manner to service distribution engine 200. Further, data extractor 1012 may be configured to parse link layer packets based on any combination of one or more of the structures described above.

Data packets may be processed by CPU(s) 1002, audio decoder 1014, and video decoder 1018. Audio decoder 1014 may be configured to receive and process audio packets. For example, audio decoder 1014 may include a combination of hardware and software configured to implement aspects of an audio codec. That is, audio decoder 1014 may be configured to receive audio packets and provide audio data to audio output system 1016 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 1016 may be configured to render audio data. For example, audio output system 1016 may include an audio processor, a digital-to-analog converter, an amplifier, and a speaker system. A speaker system may include any of a variety of speaker systems, such as headphones, an integrated stereo speaker system, a multispeaker system, or a surround sound system.

Video decoder 1018 may be configured to receive and process video packets. For example, video decoder 1018 may include a combination of hardware and software used to implement aspects of a video codec. In one example, video decoder 1018 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 AVC), and High-Efficiency Video Coding (HEVC). Display system 1020 may be configured to retrieve and process video data for display. For example, display system 1020 may receive pixel data from video decoder 1018 and output data for visual presentation. Further, display system 1020 may be configured to output graphics in conjunction with video data, e.g., graphical user interfaces. Display system 1020 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 1022 may be configured to receive input and provide output during operation of receiver device 1000. That is, I/O device(s) 1022 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 1022 may be operatively coupled to receiver device 1000 using a standardized communication protocol, such as for example, Universal Serial Bus protocol (USB), Bluetooth, ZigBee or a proprietary communications protocol, such as, for example, a proprietary infrared communications protocol.

Network interface 1024 may be configured to enable receiver device 1000 to send and receive data via a local area network and/or a wide area network. Network interface 1024 may include a network interface card, such as an Ethernet card, an optical transceiver, a radio frequency transceiver, or any other type of device configured to send and receive information. Network interface 1024 may be configured to perform physical signaling, addressing, and channel access control according to the physical and Media Access Control (MAC) layers utilized in a network. Further, network interface 1024 may include a link layer packet generator, such as for example, link layer packet generator 300 described above. Further, network interface 1024 may be configured to parse link layer packet based on any combination of one or more of the structures described above.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

(Other Descriptions)

As described above, according to another example of the disclosure, a device for generating a data packet comprises one or more processors configured to generate a packet header, wherein the packet header includes a value that signals whether the data packet encapsulates input data according to a single short packet encapsulation, a single long packet encapsulation, a segmented encapsulation, or a concatenated encapsulation and generate a payload based at least in part on whether the data packet encapsulates input data according to a single short packet encapsulation, a single long packet encapsulation, a segmented encapsulation, or a concatenated encapsulation.

According to another example of the disclosure, an apparatus for generating a data packet comprises sections for generating a packet header, wherein the packet header includes a value that signals whether the data packet encapsulates input data according to a single short packet encapsulation, a single long packet encapsulation, a segmented encapsulation, or a concatenated encapsulation and generating a payload based at least in part on whether the data packet encapsulates input data according to a single short packet encapsulation, a single long packet encapsulation, a segmented encapsulation, or a concatenated encapsulation.

According to another example of the disclosure, a non-transitory computer-readable storage medium comprises instructions stored thereon that upon execution cause one or more processors of a device to generate a packet header, wherein the packet header includes a value that signals whether the data packet encapsulates input data according to a single short packet encapsulation, a single long packet encapsulation, a segmented encapsulation, or a concatenated encapsulation and generate a payload based at least in part on whether the data packet encapsulates input data according to a single short packet encapsulation, a single long packet encapsulation, a segmented encapsulation, or a concatenated encapsulation.

The details of one or more examples are set forth in the accompanying drawings and the description above. Other features, objects, and advantages will be apparent from the description and drawings, and from the claims.

The invention claimed is:

1. A method for generating a data packet, the method comprising:
   generating a header of the data packet, wherein the header comprises (i) a base header and (ii) an additional header depending on control fields of the base header; and
   extending the data packet by an addition of an optional header according to a flag signaled by one of fields in the additional header,
   wherein
   the optional header contains a sub-stream identification, wherein the optional header for the sub-stream identification is used to filter out specific packet stream in a link layer level, when a sub-stream identifier flag is set,
   the optional header contains a header extension containing extended fields, when a header extension flag is set,
   when both the sub-stream identifier flag and the header extension flag are set, the sub-stream identification is followed by the header extension, and
   a value of a total header length of the data packet is represented as 3 bytes+Ceil((count+1)×1.5) bytes, wherein count is a number of packets included in the data packet.

2. A non-transitory computer-readable storage medium having instructions stored thereon that upon execution cause one or more processors of a device to perform any and all combinations of the steps included in claim 1.

3. A device for generating a data packet, the device comprising:
   one or more processors configured to
   generate a header of the data packet, wherein the header comprises (i) a base header and (ii) an additional header depending on control fields of the base header; and
   extend the data packet by an addition of an optional header according to a flag signaled by one of fields in the additional header,
   wherein
   the optional header contains a sub-stream identification, wherein the optional header for the sub-stream identification is used to filter out specific packet stream in a link layer level, when a sub-stream identifier flag is set,
   the optional header contains a header extension containing extended fields, when a header extension flag is set,
   when both the sub-stream identifier flag and the header extension flag are set, the sub-stream identification is followed by the header extension, and
   a value of a total header length of the data packet is represented as 3 bytes+Ceil((count+1)×1.5) bytes, wherein count is a number of packets included in the data packet.

4. The device of claim 3, wherein the device is selected from the group consisting of: a service distribution engine, a desktop or laptop computer, a mobile device, a smartphone, a cellular telephone, a personal data assistant, a tablet device, or a personal gaming device.

* * * * *